United States Patent [19]
Kusaka et al.

[11] Patent Number: 5,569,995
[45] Date of Patent: Oct. 29, 1996

[54] METHOD AND APPARATUS FOR DRIVING AND CONTROLLING SYNCHRONOUS MOTOR USING PERMANENT MAGNETS AS ITS FIELD SYSTEM

[75] Inventors: Yasushi Kusaka, Susono; Eiji Yamada, Owariasahi; Yasutomo Kawabata, Aichi-gun, all of Japan

[73] Assignee: Toyota Jidosha Kabushiki Kaisha, Toyota, Japan

[21] Appl. No.: 288,031

[22] Filed: Aug. 10, 1994

[30] Foreign Application Priority Data

Aug. 10, 1993 [JP] Japan .................................. 5-198100
Oct. 12, 1993 [JP] Japan .................................. 5-254152
Feb. 28, 1994 [JP] Japan .................................. 6-030544

[51] Int. Cl.$^6$ ...................................................... H02P 1/46
[52] U.S. Cl. .......................................... 318/717; 318/721
[58] Field of Search ................................. 318/200–724

[56] References Cited

U.S. PATENT DOCUMENTS

| | | | |
|---|---|---|---|
| 3,863,120 | 1/1975 | Rettig . | |
| 4,616,166 | 10/1986 | Cooper et al. | 318/712 |
| 4,677,360 | 6/1987 | Garces | 318/803 |
| 4,885,518 | 12/1989 | Schauder | 318/798 |
| 5,334,917 | 10/1994 | Lind | 318/254 |

FOREIGN PATENT DOCUMENTS

| | | |
|---|---|---|
| 0483894 | 5/1992 | European Pat. Off. . |
| 59-30689 | 2/1984 | Japan . |
| 60-16102 | 1/1985 | Japan . |
| 60-24676 | 6/1985 | Japan . |
| 60-139186 | 7/1985 | Japan . |
| 60-197183 | 10/1985 | Japan . |
| 60-200791 | 10/1985 | Japan . |
| 61-262006 | 11/1986 | Japan . |
| 62-88463 | 6/1987 | Japan . |
| 63-77302 | 4/1988 | Japan . |
| 1-157203 | 6/1989 | Japan . |
| 2-32785 | 2/1990 | Japan . |
| 4-285409 | 10/1992 | Japan . |
| 5-38003 | 2/1993 | Japan . |
| 5-130709 | 5/1993 | Japan . |
| 5-168273 | 7/1993 | Japan . |

OTHER PUBLICATIONS

IEEE Transactions on Industrial Electronics, vol. 35, No. 4, Nov. 1988, pp. 547–559, Bimal K. Bose, et al., "A Microcomputer–Based Control and Simulation of an Advanced IPM Synchronous Machine Drive System for Electric Vehicle Propulsion".

"Variable Speed Drive System of Permanent Magnet Synchronous Motors With Flux–Weakening Control", Kelta Hatanaka, et al., pp. 310–315 (with English Abstract and Partial English Translation).

*Primary Examiner*—David S. Martin
*Attorney, Agent, or Firm*—Oblon, Spivak, McClelland, Maier, & Neustadt, P.C.

[57] ABSTRACT

A method and an apparatus for driving and controlling a synchronous motor using permanent magnets as its field system are herein disclosed. When a rotational speed of the synchronous motor using the permanent magnets as the field system is more than a base rotational speed, a current condition computing section computes a field weakening reference current in accordance with a battery voltage, a reference torque and a rotational speed. An inverter performs the field weakening control of the the synchronous motor using the permanent magnets as the field system in accordance with the field weakening reference current sent from the current condition computing section to prevent the deterioration of efficiency and the deficiency of output due to the excessive or insufficient field weakening current. The current condition computing section determines optimum reference current by the use of a converged battery voltage, when the battery voltage is converged to a constant value after initial control.

22 Claims, 18 Drawing Sheets

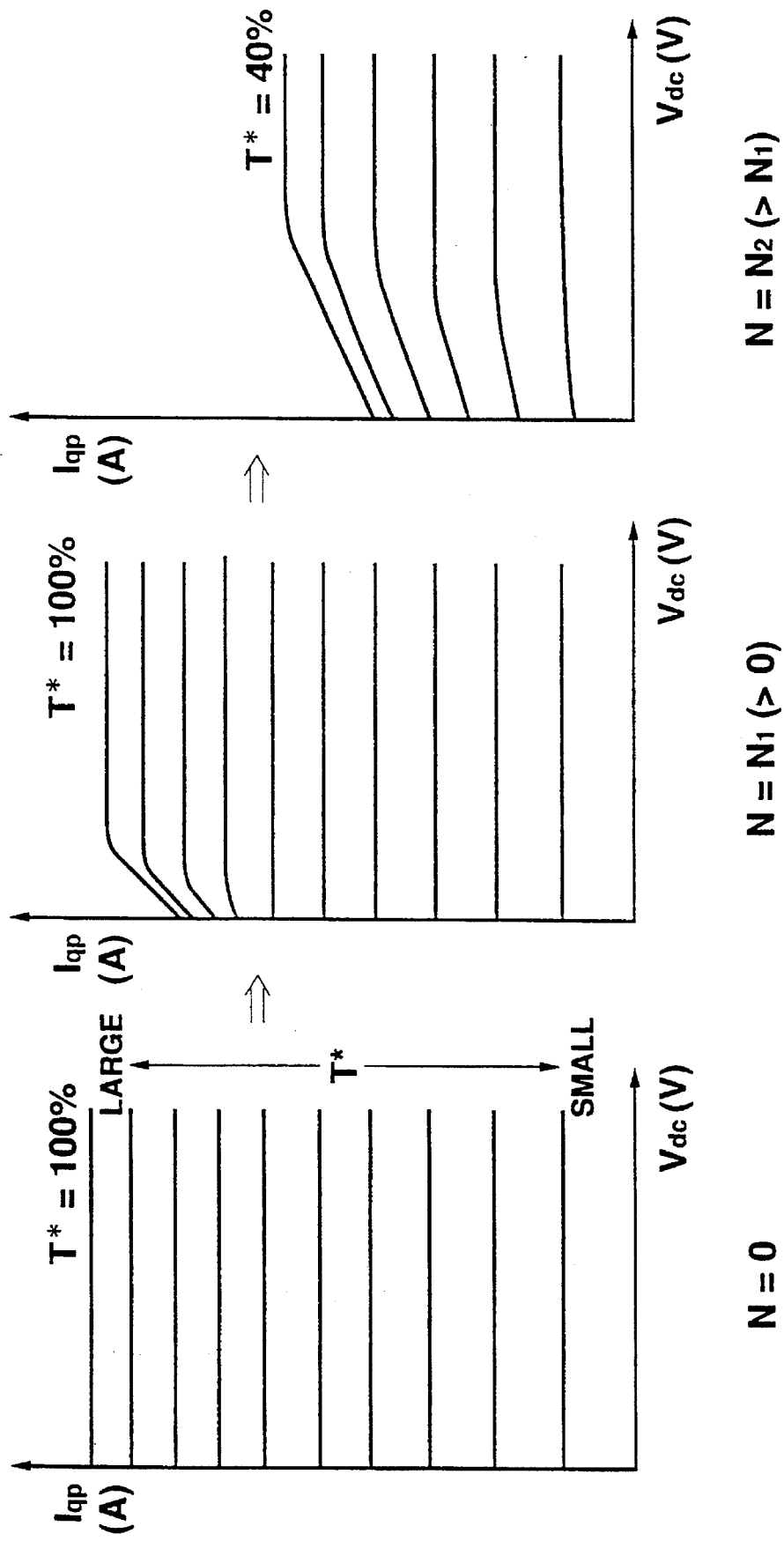

METHOD AND APPARATUS FOR DRIVING AND CONTROLLING SYNCHRONOUS MOTOR USING PERMANENT MAGNETS AS ITS FIELD SYSTEM

BACKGROUND OF THE INVENTION (a) Field of the Invention

The present invention relates to a driving and controlling apparatus for controlling the output torque of a synchronous motor using permanent magnets as its field system (hereafter referred to as PM motor) so as to attain a reference torque by controlling the vector of a motor current. Particularly, it relates to the control of a PM motor which can be suitably mounted on an electric vehicle and can execute field weakening control.

(b) Description of the Prior Art

A PM motor is a synchronous motor using permanent magnets as its field system. Therefore, it is characterized by having a large magnetomotive force per unit volume. This characteristic is effective for increasing the output of a motor and reducing the size of a motor. Particularly, the PM motor is preferable as the drive motor of an electric vehicle.

FIG. 20 shows an equivalent circuit per phase of a PM motor. In FIG. 20, the magnetomotive force of permanent magnets used as a field system, that is, the main magnetic flux of the PM motor, is shown by the symbol $E_o$. When assuming the axial angular velocity of the PM motor as $\omega$ (=$2\pi N$, N: rotational speed of the motor), the counter electromotive force generated during operation of the PM motor can be expressed as $\omega E_o$. When the PM motor is driven by converting the discharge output of a battery into alternating current by an inverter and using the AC power, the terminal voltage V of the PM motor is obtained by multiplying a battery voltage $V_{dc}$ by the voltage conversion ratio of the inverter. In FIG. 20, symbol R represents the primary resistance per phase of the PM motor, L represents the inductance per phase, and I represents the primary current (phase current).

The motor current I of the PM motor can be decomposed into the vector components, i.e., the field current $I_d$ and the torque current $I_q$. The field current $I_d$ is a component for generating a field flux in the PM motor and the torque current $I_q$ is a component for generating torque by intersecting with the field flux of permanent magnets, that is, the main magnetic flux $E_o$. When the PM motor is provided with saliency, the field current $I_d$ also generates torque. The torque generated when the torque current $I_q$ intersects with the main magnetic flux $E_o$ is known as magnetic torque and the torque caused by the saliency is known as reluctance torque. The following equation (1) is an expression showing the torque T of the PM motor, In which the first term at the right side shows magnetic torque and the second term shows reluctance torque. Therefore, the second term does not appear when the PM motor is a non-salient-pole motor.

$$T = E_o + (L_d - L_q)I_d I_q \quad (1)$$

$L_d$ and $L_q$ in the equation (1) are called d-axis inductance and q-axis inductance respectively, which are the d-axis component and q-axis component of the inductance L of the PM motor respectively. The terminal voltage V of the PM motor can also be decomposed into the d-axis component and q-axis component. The d-axis component and q-axis component of the terminal voltage V, that is, d-axis voltage $V_d$ and q-axis voltage $V_q$, can be expressed as shown below by using the field current $I_d$, torque current $I_q$, d-axis inductance $L_d$, and q-axis inductance $L_q$ when the number of pole pairs is 1.

$$V_d = RI_d + j\omega L_q I_q$$

$$V_q = j\omega L_d I_d + RI_q + \omega E_o \quad (2)$$

j: An Imaginary component

Moreover, the following relationship exists between d-axis voltage $V_d$ and q-axis voltage $V_q$.

$$|V|^2 = |V_d|^2 + |V_q|^2 \quad (3)$$

In general, because the primary resistance R of the PM motor is much smaller than the inductance, it is possible to ignore the resistance R. When the primary resistance R is ignored, the equation (2) is expressed as shown below. FIG. 21 shows a vector diagram of the PM motor drawn in accordance with the equation (4).

$$V_d = j\omega L_q I_q$$

$$V_q = j\omega L_d I_d + \omega E_o$$

$$V = \omega E_o + j\omega L_q I_q + j\omega L_d I_d \quad (4)$$

To control the PM motor having the above characteristics, it is preferable to control the vector of the motor current I. For example, it is preferable to decompose the motor current I into the field current component $I_d$ and the torque current component $I_q$ and control the absolute value of each component. To control the vector of the motor current I of the PM motor, the controller receives a command for a vector to be outputted from the PM motor, that is, a reference torque $T^{\Leftrightarrow}$ from a supervisor controller. The controller receiving the reference torque $T^{\Leftrightarrow}$ determines the field current $I_d$ and the torque current $I^{\Leftrightarrow}$ which are control targets so that the reference torque $T^{\Leftrightarrow}$ is realized. In this case, it is not necessary to excite the PM motor with the field current $I_d$, because permanent magnets generate the main magnetic flux. Therefore, the field current $I_d$ is normally controlled to 0 or some other specified value. When the field current $I_d$ is kept constant, it is possible to control the torque T with the torque current $I_q$ as shown by the equation (1). Therefore, the reference torque $T^{\Leftrightarrow}$ is exclusively used to determine the torque current $I_q$. The controller outputs the determined field current and torque current $I_q$ to a motor controller as a reference field current $I_d^{\Leftrightarrow}$ and a reference torque current $I_q$ respectively. The motor controller controls a power converter such as an inverter so that the field current $I_d$ and the torque current $I_d^{\Leftrightarrow}$ corresponding to the reference field current $I_d^{\Leftrightarrow}$ and the reference torque current $I_q^{\Leftrightarrow}$ respectively flow through the PM motor. Though the motor current I can be decomposed into the vector components of the field current I can be and the torque current $I_q$ as shown above, it is also possible to decompose the motor current I into an absolute value component |I| and a phase component argI.

To control the vector of the current I of the PM motor, it is preferable to perform the field weakening control at the same time. The field weakening control is defined as the control for weakening a field flux when the PM motor rotates at a high speed.

As shown in the equation (4) and FIG. 21, when the rotational speed N of the PM motor, namely, the axial angular velocity $\omega$ of the PM motor increases, the counter electromotive force $\omega E_o$ increases in proportion to the increase of the axial angular velocity $\omega$ and the terminal voltage V of the PM motor increases with the increase of the counter electromotive force $\omega E_o$. When the terminal voltage V of the PM motor exceeds a value corresponding to the battery voltage $V_{dc}$, a voltage corresponding to the difference between the terminal voltage V and the battery voltage $V_{dc}$ is applied to an inverter provided between the PM motor or the power source. This voltage causes the inverter or the like to be damaged. Hereafter, the rotational speed N of the PM motor when the terminal voltage V equals a value corresponding to the battery voltage $V_{dc}$ is referred to as a base rotational speed $N_B$. The region of rotational speed equal to or higher than the base rotational speed $N_B$ is referred to as a high rotation region, the region of rotational speed equal to or lower than the base rotational speed $N_B$ is referred to as a low rotation region, and the region of rotational speed close to the base rotational speed $N_B$ is referred to as a medium rotation region.

In the PM motor, a field flux is mainly generated by permanent magnets. However, when the vector of the motor current I is controlled as described above, it is possible to generate a field flux having a necessary intensity by utilizing the field current $I_d$, and also to generate a field flux with an intensity which partially cancels the field flux (main magnetic flux) $E_o$ generated by the permanent magnets. The field weakening control can specifically be executed as the control for generating a field flux with an intensity which partially cancels the main magnetic flux $E_o$, by controlling the field current $I_d$ to a negative value. When this type of control is performed, the absolute value of the terminal voltage V decreases as shown by the equation (4) and FIG. 21. Therefore, when performing the field weakening control by aiming at the field current $I_d$ with a proper intensity, it is possible to control the terminal voltage V in the high rotation region to the battery voltage $V_{dc}$ or lower. The field current $I_d$ when the field weakening control is executed is referred to as a field weakening current.

To execute the field weakening control, the value of the field weakening current $I_d$ is normally determined in accordance with the rotational speed N of the PM motor and the requested output torque (=reference torque $T^{\leftrightarrow}$) by assuming that the battery voltage $V_{dc}$ is constant. For example, as shown in FIG. 22, the field current $I_d$ is controlled to 0 in the low rotation region. As the rotational speed N increases exceeding the base rotational speed $N_B$, the effective amplitude of the field weakening current $I_d$ is varied from $-30$ A to $-50$ A, to $-100$ A, ... in that order.

The field weakening control is disclosed in "Variable Speed Drive System of Permanent Magnet Synchronous Motors with Flux-weakening Control", Keita HATANAKA et al., at the 1991 General Conference No. 74 of the Industrial Application Division of The Institute of Electrical Engineers of Japan, pp 310–315.

However, because the actual battery voltage $V_{dc}$ greatly depends on its state of charge (SOC) and load state, the field weakening current $I_d$ may become too large or too small. This causes a problem that the efficiency lowers or the reference torque $T^{\leftrightarrow}$ is not accurately realized.

In this case, a value obtained by converting the battery voltage $V_{dc}$, assumed to determine the field weakening current $I_d$, into a value comparable with the terminal voltage V is referred to as an allowable power-source voltage $V_B$. When the allowable power-source voltage $V_B$ is higher than the actual battery voltage $V_{dc}$, the field weakening current $I_d$ with an absolute value excessively larger than reference torque $T^{\leftrightarrow}$ flows. In other words, the absolute value of the field current $I_d$ increases, which is a current component not contributing to generation of torque. This means that the efficiency lowers. Conversely, when the allowable power-source voltage $V_B$ is lower than the actual battery voltage $V_{dc}$, it is impossible to provide sufficient field weakening current $I_d$ to control the terminal voltage V to the allowable power-source voltage $V_B$ or lower, or sufficient torque current $I_q$ to realize the reference torque $T^{\leftrightarrow}$.

SUMMARY OF THE INVENTION

It is the first object of the present invention to make it possible to control the field weakening current $I_d$ in accordance with a change of the actual battery voltage $V_{dc}$ and to execute optimum field weakening control.

It is the second object of the present invention to secure the efficiency and favorably achieve the reference torque $T^{\leftrightarrow}$.

It is the third object of the present invention to secure the efficiency and achieve the reference torque $T^{\leftrightarrow}$ while considering the operation of an inverter, when one is used.

It is the fourth object of the present invention to secure the accelerating performance from standstill and to simultaneously prevent the efficiency from lowering due to decrease of the battery voltage $V_{dc}$ caused by degradation of SOC (relative remaining capacity of the battery).

It is the fifth object of the present invention to improve the drive feeling of an electric vehicle.

It is the sixth object of the present invention to allow a user to select the drive in consideration of efficiency in consideration of output, and thus, it is possible to flexibly fulfill the user's request.

It is the seventh object of the present invention to favorably secure the output of a loaded motor.

It is the eighth object of the present invention to realize an efficient control performance.

It is the ninth object of the present invention to minimize the storage capacity necessary for control.

The first aspect of the present invention is directed to a driving and controlling apparatus for use in a drive unit having a PM motor which can be excited by a field flux generated by permanent magnets and a field flux generated by a field current component in a primary current, a battery as a source of power, and power conversion means for converting power discharged from the battery into alternating current and feeding the alternating current as the primary current to the PM motor; said apparatus comprising:

(a) current control means for controlling the primary current of the PM motor in accordance with a reference current; and (b) current condition determination means for minimizing the reference current in accordance with the voltage of a battery under a predetermined condition and at least partially cancelling the field flux generated by the permanent magnets with the field flux generated by the field current component so that the counter electromotive force of the PM motor does not exceed the voltage of the battery and so that the field flux generated by the field current component has an intensity corresponding to the voltage of the battery.

The second aspect of the present invention is directed to a driving and controlling apparatus for use in the above-described drive unit, said apparatus comprising:

(a) current control means for controlling a primary current of the PM motor in accordance with a reference current; and (b) current condition determination means having;

(b1) counter electromotive force judgment means for judging whether or not the counter electromotive force of a synchronous motor exceeds the voltage of the battery in accordance with the output state of the PM motor;

(b2) means for determining a reference current so that the field flux generated by the field current component is fixed to 0 or a specific value, when it is judged that the counter electromotive force does not exceed the voltage of the battery; and (b3) means for minimizing the reference current in accordance with the voltage of the battery so that the counter electromotive force of the PM motor does not exceed the voltage of the battery and so that the field flux generated by the field current component has an intensity corresponding to the voltage of the battery, and at least partially cancelling the field flux generated by permanent magnets with the field flux generated by the field current component, when it is judged that the counter electromotive force exceeds the voltage of the battery.

The third aspect of the present invention is directed to a method for controlling the drive unit, said method comprising the steps of:

(a) judging whether or not the counter electromotive force of the PM motor exceeds the voltage of the battery in accordance with the output state of the PM motor;

(b) determining a reference current so that the field flux generated by the field current component is fixed to 0 or a specific value, when it is judged that the counter electromotive force does not exceed the voltage of the battery;

(c) minimizing the reference current in accordance with the voltage of the battery so that the counter electromotive force of the PM motor does not exceed the voltage of the battery and so that the field flux generated by the field current component has an intensity corresponding to the battery voltage, when it is judged that the counter electromotive force exceeds the voltage of the battery; and (d) controlling a primary current of the PM motor in accordance with the reference current to at least partially cancel the field flux generated by permanent magnets with the field flux generated by the field current component.

In the present invention, the reference current regarding the so called field weakening is determined in accordance with the voltage of the battery. Therefore, even if the battery voltage fluctuates due to the SOC or remaining capacity of the battery, or the load of the PM motor, it is possible to compute the optimum field weakening current and to perform the optimum field weakening control. This preferably secures the efficiency and achieves the requested torque. For example, when the battery voltage rises, it is possible to maintain a predetermined efficiency without causing excessive field weakening current to flow. When the battery voltage lowers, it is possible to cause sufficient current to flow to obtain the necessary torque.

The PM-motor output state used to judge whether or not the counter electromotive force of the PM motor exceeds the voltage of the battery is, for example, the rotational speed of the PM motor. When the PM-motor rotational speed is higher than a predetermined value (base rotational speed), it is possible to judge that the counter electromotive force of the PM motor exceeds the battery voltage. Conversely, when the PM-motor rotational speed is not higher than the predetermined value, it is possible to judge that the former does not exceed the latter.

To control the primary current, vector control is performed. For example, the reference current can be decomposed into the reference field current, indicating the target for controlling the field current component of the primary current, and a reference torque current, indicating the target for controlling the torque current component of the primary current. In the case of the above vector decomposition, the field weakening control in the present invention is realized by determining the reference field current in accordance with at least the battery voltage, and using the determined reference field current as a field weakening reference current. Output torque is realized mainly by determining a reference torque current in accordance with at least a reference torque. Because a mathematical equation or a map showing a relationship between an output torque, the field current and the torque current is normally used, the reference torque is referenced to determine the reference field current and the battery voltage is referenced to determine the reference torque current. To use the determination method above, the voltage of the battery is previously converted into a value comparable with the terminal voltage of the PM motor. For the conversion, the power conversion rate in the power conversion means is assumed to be maximum and it is converted into the maximum voltage value to be applied to the motor.

As described above, when the field weakening current is set, by computing it in accordance with the battery voltage, the field weakening current value increases due to a battery voltage drop caused by the degradation of the SOC of the battery. In this case, the efficiency lowers due to the increase of the field weakening current. In the present invention, the field weakening current is limited in accordance with the SOC of the battery in order to cope with the above state. That is, by limiting the field weakening current when the SOC of the battery SOC is degraded to a predetermined value or less, the efficiency is prevented from lowering because the field weakening current does not increase even if the battery voltage lowers due to degradation of the SOC. Moreover, even in this case, because the torque is secured in the low-rotation high-torque region, the accelerating performance from standstill is secured, and the drive feeling is favorably secured when the PM motor is used as the drive unit of an electric vehicle.

However, limitation of the field weakening current causes the output torque to be insufficient in the high rotation region. Therefore, by executing or stopping the limitation of the field weakening current in accordance with, for example, a command from a user, the user can select drive with emphasis on efficiency or drive with emphasis on output. Thus, it is possible to flexibly fulfill the user's request.

The fourth aspect of the present invention is directed to a driving and controlling apparatus for use in the drive unit, said apparatus comprising:

(a) current control means for controlling the primary current of the PM motor in accordance with a reference current; and (b) current condition determination means having:

(b1) means for determining an initial reference current in accordance with a reference torque, an output state of a synchronous motor and a reference minimum voltage on the assumption that the battery voltage is the reference minimum voltage, when either of the reference torque and the synchronous-motor output state changes by as much as a predetermined value or more, and giving the determined initial reference current to the current control means as a reference current; and (b2) means for determining the reference current in accordance with a converged battery voltage so that the counter electromotive force of the synchronous motor does not exceed the battery voltage and so that the field flux generated by the field current component has an intensity corresponding to the voltage of the battery under predetermined conditions, when the battery voltage is converged to a constant value after the primary current of the PM motor has been controlled in accordance with the initial reference current, determining the reference current in accordance with the battery voltage under the above predetermined conditions, and at least partially cancelling the field flux generated by permanent magnets with the field flux generated by the field current component.

The fifth aspect of the present invention is directed to a method for controlling the drive unit, said method comprising the steps of:

(a) judging whether or not either of a reference torque or an output state of the PM motor change by as much as a predetermined value or more;

(b) determining an initial reference current in accordance with the reference torque, the output state of the PM motor and a reference minimum voltage on the assumption that the voltage of the battery is the reference minimum voltage, when either of the reference torque or the output state of the PM motor change by as much as a predetermined value or more;

(c) controlling the primary current of the PM motor in accordance with the initial reference current;

(d) determining the reference current in accordance with a converged battery voltage so that the counter electromotive force of the PM motor does not exceed the voltage of the battery and so that the field flux generated by the field current component has an intensity corresponding to the voltage of the battery, when the voltage of the battery is converged to a constant value after the primary current of the PM motor has been controlled in accordance with the initial reference current; and (e) controlling the primary current of the PM motor in accordance with the reference current to at least partially cancel the field flux generated by permanent magnets with the field flux generated by the field current component.

In the present invention, the battery voltage is first assumed to be the reference minimum voltage, when either of the reference torque or the motor output state change by as much as the predetermined value or more. Then, the initial reference current is obtained in accordance with the reference torque, the motor output state and the reference minimum voltage, and the vector of a motor current is controlled in accordance with the obtained initial reference current. When the motor is loaded, the battery voltage changes due to the above control. In the present invention, when the battery voltage is converged after the vector of a motor current is controlled by the initial reference current, the optimum reference current is obtained in accordance with the converged battery voltage. Moreover, the vector of the motor current is controlled in accordance with the obtained reference current.

Therefore, in the present invention, even if the reference torque or the motor output state suddenly increases, it is possible to secure the motor output by following the sudden increase and moreover, the optimum control is realized in correspondence with the converged battery voltage. Thus, the driving and controlling apparatus having a high energy efficiency and being suitable for mounting on board an electric vehicle is obtained.

Moreover, in the present invention, the reference minimum voltage is set in accordance with the SOC, or remaining capacity, and the voltage of the battery. That is, a battery-voltage drop due to the increase of the PM-motor load tends to depend on the SOC, or remaining capacity of the battery. Therefore, in the present invention, the initial reference current is set in accordance with the SOC, or remaining capacity and the voltage of the battery. By setting the initial reference current in the above manner, it is avoided to excessively decrease the battery voltage value when obtaining the initial reference current and more efficient control performance is obtained even when the battery voltage has not yet converged.

The sixth aspect of the present invention is directed to a driving and controlling apparatus for use in the drive unit, said apparatus comprising:

(a) current control means for controlling a primary current of the PM motor in accordance with reference current; where an optimum current depends on the voltage of the battery when the output state of the synchronous motor is in a predetermined region and does not depend on the voltage of the battery when the output state of the synchronous motor is not in the predetermined region, the optimum current representative of the reference current where the reference torque is realized as the torque of the synchronous motor and the efficiency of the synchronous motor substantially becomes a maximum efficiency; and (b) current condition determination means having:

(b1) means for determining an initial reference current in accordance with the reference torque, the output state of the PM-motor and a reference minimum voltage on the assumption that the voltage of the battery is the reference minimum voltage, when either of the reference torque or the output state of the PM-motor change by as much as a predetermined value or more, and giving the determined initial reference current as the reference current to the current control means;

(2) means for obtaining a first optimum reference current by referring to a relationship between the voltage of the battery, the optimum current and the output state of the PM-motor as a result of the converged battery voltage and PM-motor output state in a region where a value of the optimum current depends on the voltage of the battery, when the voltage of the battery is converged to a constant value after a primary current of the PM motor has been controlled in accordance with the initial reference current;

(b3) means for obtaining a second optimum reference current from the optimum current in a region where the optimum current does not depend on the voltage of the battery;

(b4) means for selecting either of the first and second optimum reference currents so that the counter electromotive force of the PM motor does not exceed the voltage of the battery and so that the field flux generated by the field current component has an intensity corresponding to the voltage of the battery under predetermined conditions, on the basis of a relationship between a magnitude of the first optimum reference current and that of the second optimum reference current; and (b5) means for determining the selected optimum current value as the reference current.

The seventh aspect of the present invention is directed to a method for controlling the drive unit, said method comprising the steps of:

(a) judging whether or not either of a reference torque or an output state of the PM motor change by as much as a predetermined value or more;

(b) determining an initial reference current in accordance with the reference torque, the output state of the PM-motor and a reference minimum voltage on the assumption that the voltage of the battery is the reference minimum voltage, when either of the reference torque or the output state of the PM-motor change by as much as a predetermined value or more;

(c) controlling the primary current of the PM motor in accordance with the initial reference current;

(d) obtaining a first optimum reference current by referring to a relationship between the voltage of the battery, an optimum current and the output state of the PM-motor, by the converged battery voltage and PM-motor output state in a region where a value of the optimum current depends on the voltage of the battery, when the voltage of the battery is converged to a constant value after a primary current of the PM motor has been controlled in accordance with the initial reference current; wherein an optimum current depends on the voltage of the battery when the output state of the synchronous motor is in a predetermined region and does not depend on the voltage of the battery when the output state of the synchronous motor is not in the predetermined region, the optimum current representative of the reference current where the reference torque is realized as the torque of the synchronous motor and the efficiency of the synchronous motor substantially becomes a maximum efficiency;

(e) determining a second optimum reference current from the optimum current in a region where the optimum current does not depend on the voltage of the battery;

(f) selecting either of the first or second optimum reference currents so that the counter electromotive force of the PM motor does not exceed the voltage of the battery and so that the field flux generated by the field current component has an intensity corresponding to the voltage of the battery, on the basis of a relationship between a magnitude of the first optimum reference current and that of the second optimum reference current;

(g) determining the selected optimum current as the reference current; and (h) controlling the primary current of the PM motor in accordance with the reference current to at least partially cancel the field flux generated by permanent magnets with the field flux generated by the field current component.

In the present invention, the first optimum reference current which should be used as the first reference current is determined in accordance with the converged battery voltage and synchronous-motor output state, by the utilization of a relationship between the voltage of the battery, the optimum current and the output state of the PM-motor. The first optimum reference current has the value of the primary current for maximizing the efficiency of the motor to realize the reference torque in the region where the value of the primary current depends on the battery voltage. In contrast, the value of the primary current in a region where the value of the primary current for maximizing the PM-motor efficiency does not depend on the battery voltage is referred to as the second optimum current and the reference current for instructing the second optimum current is referred to as the second optimum reference current. In the present invention, the reference current is determined by comparing the magnitude of the first optimum reference current with that of the second optimum reference current, namely, judging whether the primary current depends on the battery voltage.

Particularly, when the first optimum current is approximated by a mathematical equation and its coefficient is stored by making the coefficient correspond to the output state of the PM-motor while the second optimum current is stored, the first optimum reference current can be determined by reading the stored coefficient of the mathematical equation in accordance with the output state of the synchronous motor and using the read coefficient, the converged battery voltage, and the above mathematical equation. The second optimum reference current can be determined by reading the stored second optimum current. Thus, the reference current after controlling the vector of a motor current with an initial reference current can be determined only by storing a coefficient such as the inclination of the mathematical equation and the second optimum current, when a linear equation is used as the mathematical equation. Therefore, because the reference current can be determined without storing, for example, a lot of data showing the relationship between reference torque, motor rotational speed, and battery voltage, it is not necessary to use an expensive CPU. In particular, when the approximate equation is a linear equation, it is sufficient to store only the inclination or intercept of the linear equation as the coefficient. Therefore, the region for storing the data is further decreased. It is possible to use the intercept for the initial reference current.

BRIEF DESCRIPTION OF THE DRAWINGS

FIGS. 9A–9C are illustrations showing the relation between motor rotational speed, reference torque value and battery voltage, and optimum torque current component for optimizing the motor efficiency about a salient-pole motor;

DETAILED DESCRIPTION OF THE PREFERRED EMBODIMENTS

Preferred embodiments of the present invention are described below by referring to the accompanying drawings.

(a) System constitution

Figure 1:
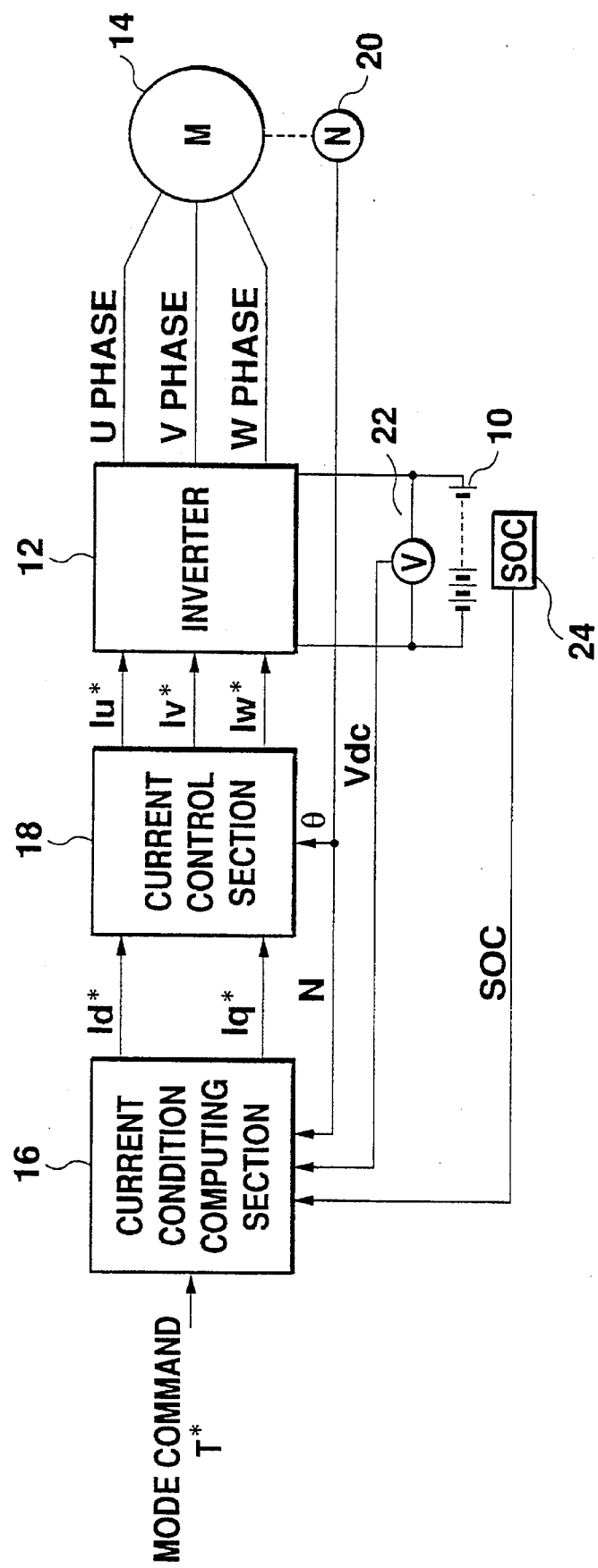
FIG. 1 is a block diagram showing the system constitution of an electric vehicle to which each embodiment of the present invention is suitable.

FIG. 1 shows a system environment suitable for executing each embodiment of the present invention. The system shown in FIG. 1 is an electric vehicle drive system and its controller. In the system shown in FIG. 1, the electric discharge output of a battery 10 is converted from DC to 3-phase AC by an inverter 12 and fed to a PM motor 14.

The power conversion operation in the inverter 12 is vector-controlled by a current condition computing section 15 and a current control section 18. The current condition computing section 16 determines a field reference current $I_{d[cm]dithu}$ and reference torque current $I_q^\leftrightarrow$ in accordance with a reference torque $T^\leftrightarrow$ having a value corresponding to an amount of depression of an accelerator or brake pedal by a driver given from a supervisor control section (vehicle controller, regeneration controller, or the like), and feeds the reference currents to the current control section 18.

The current control section 18 Inputs not only these reference currents $I_d^\leftrightarrow$ and $I_q^\leftrightarrow$ but also the angular position θ of the rotor of the motor 14 detected by a motor rotational-position sensor 20 affixed to the motor 14. The current control section 18 performs the rotational transform of the θ, current vector coordinate in correspondence to the position in order to realize the alternation of current, and simultaneously generates U, V, and W phase reference currents $I_U^\leftrightarrow$, $I_V^\leftrightarrow$, and $I_W^\leftrightarrow$ in accordance with the reference currents $I_d^\leftrightarrow$ and $I_q^\leftrightarrow$ to feed them to the inverter 12.

The inverter 12 generates, for example, PWM (pulse width modulation) signals in accordance with the fed reference currents $I_U^\leftrightarrow$, $I_V^\leftrightarrow$ and $I_W^\leftrightarrow$. The inverter 12 comprises, for example, a plurality of switching devices such as an IGBTs (insulated gate bipolar transistors). These switching devices are switched by the PWM signals generated by conversion so that currents $I_U^\leftrightarrow$, $I_V^\leftrightarrow$, and $I_W^\leftrightarrow$ with values corresponding to the reference currents $I_U^\leftrightarrow$, $I_V^\leftrightarrow$, and $I_W^\leftrightarrow$ flow through the U, V, and W phases of the motor 14. When this type of switching 1s performed, the field current $I_d^\leftrightarrow$ and torque current $I_q^\leftrightarrow$ having values which correspond to the reference currents $I_d^\leftrightarrow$ and flow through the U, V, and W phases of the motor 14 and these currents generate the alternating magnetic field. The torque T outputted from the motor 14 as the result of the above current control comes to a value corresponding to the reference torque $T^\leftrightarrow$.

The current condition computing section 16 normally controls the reference field current $I_d^\leftrightarrow$ to a constant value, for example, 0. Therefore, the field flux in the motor 14 is kept constant. The current condition computing section 16 changes the reference torque current $I_q^\leftrightarrow$ in accordance with a change of the reference torque $T^\leftrightarrow$. Thus, since the time constant for responding to the torque current component $I_q^\leftrightarrow$ is small, it is possible to rapidly change the output torque of the motor 14.

Moreover, the current condition computing section 16 executes the field weakening control. Therefore, the current condition computing section 16 detects the rotational speed N of the motor 14 with the motor rotational-position sensor 20.

In the present invention, the value of the field weakening reference current $I_d^\leftrightarrow$ is changed in accordance with the battery voltage $V_{dc}$. Thus, it is possible to favorably execute the field weakening control in accordance with a change of the battery voltage $V_{dc}$. In the system shown in FIG. 1, a voltage sensor 22 is affixed to the battery 10 to realize the above control, and the voltage $V_{dc}$ between both terminals of the battery 10 is detected by the voltage sensor 22. It is also possible to estimate the battery voltage $V_{dc}$ In accordance with an SOC of the battery 10 or a vehicle state such as a road load. In FIG. 1, a member 24 set to the battery 10 is an SOC sensor for detecting an SOC of the battery 10.

The present invention is not restricted to the system constitution of FIG. 1.

(b) First embodiment

Figure 2:
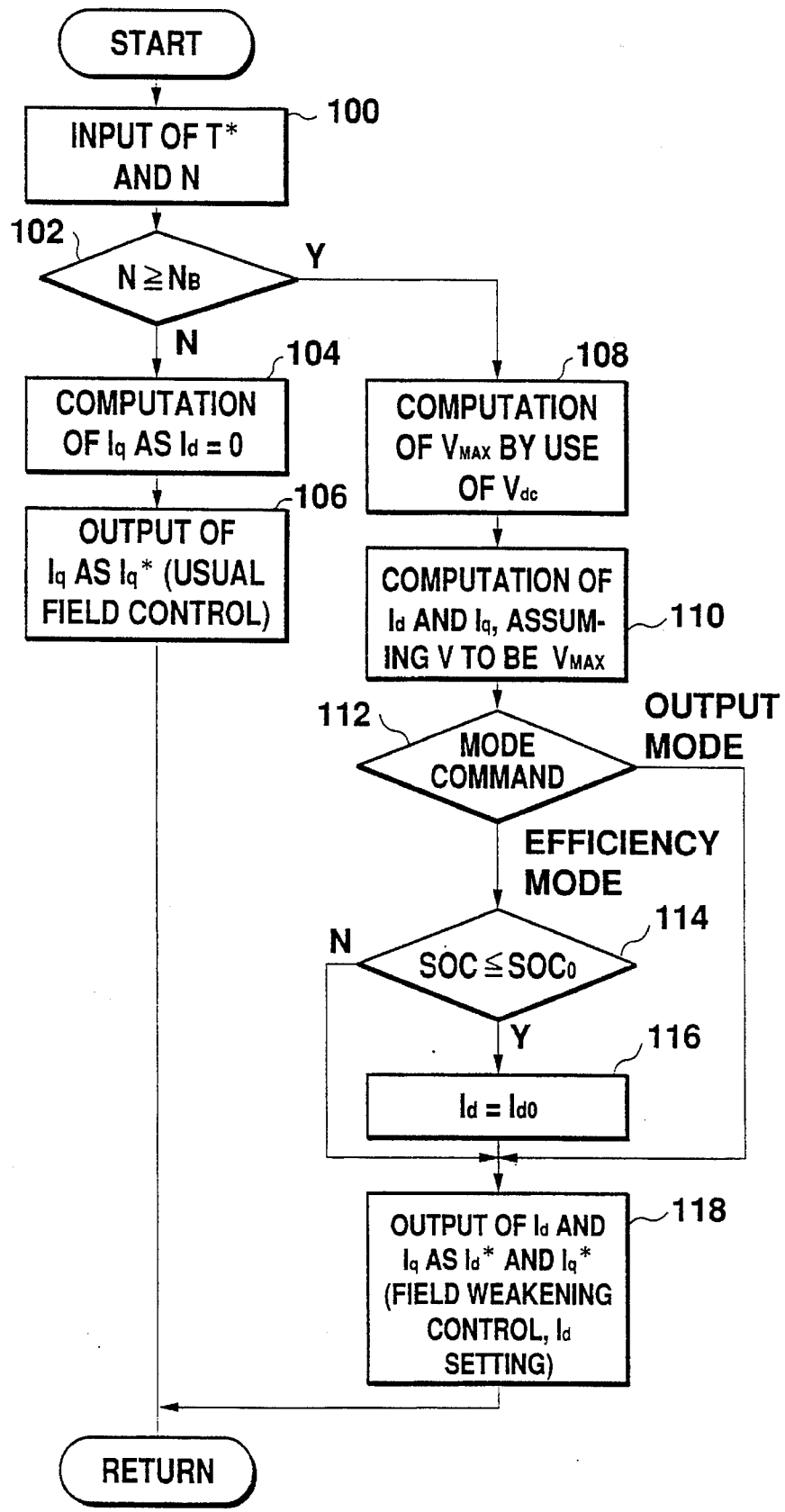
FIG. 2 is a flow chart showing the operation of a current condition computing section in the first embodiment of the present invention.

FIG. 2 shows the flow of operation of the current condition computing section 16 in the first embodiment of the present invention.

The current condition computing section 16 receives the reference torque $T^\leftrightarrow$ from a not-illustrated supervisor controller and the motor rotational speed N from the motor rotational-position sensor 20, respectively (step 100). The current condition computing section 16 compares the inputted motor rotational speed N with the base rotational speed $N_B$ of the PM motor 14 (102).

When the rotational speed N is lower than the base rotational speed $N_B$, the current condition computing section 16 computes the torque current $I_q$ by substituting "ω=2πN", "$I_d$=0" and "T=T$^\leftrightarrow$" for the equation (1) (step 104) and outputs the obtained torque current $I_q$ as the reference torque current $I_q^"$ (step 106). Because the main magnetic flux $E_o$ is already known, the above computation is possible. In this case, the current condition computing section 16 outputs 0 or a constant value as the field reference current $I_d^{\leftrightarrow}$. Normal field control is performed in the above manner.

When the rotational speed N is equal to or higher than the base rotational speed $N_B$, the current condition computing section 16 performs the field weakening control. This embodiment is characterized by the improved field weakening control.

For the field weakening control, the current condition computing section 16 first computes the maximum motor-applied voltage $V_{MAX}$ in accordance with the battery voltage detected by the voltage sensor 22 (108). In more detail, the current condition computing section 16 converts the present battery voltage $V_{dc}$ from an input-side value to an output-side value, of the inverter 12. An obtained converted value is used as the maximum motor-applied voltage $V_{MAX}$. In this case, the current condition computing section 16 assumes the PWM modulation factor of the inverter 12 to be 100%. Therefore, the maximum motor-applied voltage $V_{MAX}$ comes to a value representing the highest inverter output voltage obtained from the present battery voltage $V_{dc}$. Particularly, when a triangular wave is used as the carrier wave of a PWM signal in the inverter 12, the current control section 18 gives the reference currents $I_U^{\leftrightarrow}$, $I_V^{\leftrightarrow}$, and $I_W^{\leftrightarrow}$ to the inverter 12 as sine-wave signals, and the inverter 12 generates the PWM signals by comparing these sine-wave signals with the carrier wave, respectively, the arithmetic equation evaluated in the step 108 is shown as follows:

$$V_{MAX}=3^{1/2}V_B/(2*2^{1/2}) \quad (5)$$

Needless to say, this is just one example of PWM signal generating methods. In the present invention, it is also possible to use a wave other than the triangular wave as the carrier wave. In this case, although the above equation (5) cannot directly be used, a person skilled in the art can easily modify the equation (5) based on the disclosure of this application.

The current condition computing section 16 computes the field weakening current $I_d$ and the torque current $I_q$ by substituting "$\omega=2\pi N$", "$T=T^{\leftrightarrow}$" and "$V=V_{MAX}$" for the equations (1) to (3) (110). That is, because $L_d$, $L_q$, R, and $E_o$ are already known, it is possible to solve these equations for $I_d$ and $I_q$ by applying $\omega$, T and V to these equations (1) to (3). Because the term of $I_d I_q$ is included in the equation (1), the operation is complicated. To avoid this problem, it is recommended to prepare and store a map for obtaining $I_d$ and $I_q$ corresponding to N, T and V by referring to N, T and V as keys. Thus, it is possible to execute the step 110 simply by referring to the map. It is also possible to use the equation (4) instead of the equation (2).

Then, the current condition computing section 16 judges whether a mode command given from an operator through a supervisor controller indicates selection of an output mode or an efficiency mode (112). When the section 16 judges that the mode command indicates "output mode", it executes the step 118 by skipping the steps 114 and 116. When the section 16 judges that the mode command indicates "efficiency mode", it executes the step 118, after executing the steps 114 and 116. In the step 114, the current condition computing section 16 judges whether an SOC detected by the SOC sensor 24 is the predetermined value $SOC_o$ or less, that is, whether the SOC has degraded. When the section 16 judges that the SOC has not degraded, it skips the step 116. When the section 16 judges that the SOC has degraded, it limits the value of the field weakening current $I_d$ computed in the step 110 to a predetermined value $I_{do}$ (116).

The field current $I_d$ and torque current $I_q$ thus obtained are outputted to the inverter 12 as the field weakening reference current $I_d^{\leftrightarrow}$ and the reference torque current $I_q^{\leftrightarrow}$ (118). The field weakening control in this embodiment is performed in the above manner.

For this embodiment, as described above, the actual battery voltage $V_{dc}$ is considered to determine the field weakening reference current $I_d^{\leftrightarrow}$ and the reference torque current $I_q^{\leftrightarrow}$. For example, when the battery voltage $V_{dc}$ fluctuates due to a change of the SOC of the battery 10 or depending on a load of the PM motor 14, the maximum motor-applied voltage $V_{MAX}$ changes in correspondence with the fluctuation of the battery voltage $V_{dc}$. Thereby, the field weakening reference current $I_d^{\leftrightarrow}$ and the reference torque current $I_q^{\leftrightarrow}$ computed in accordance with the maximum motor-applied voltage $V_{MAX}$ are also changed. This embodiment realizes the optimum field weakening control for preventing too-large or too-small a field weakening current $I_d$ from flowing, due to the above control.

Figure 3:
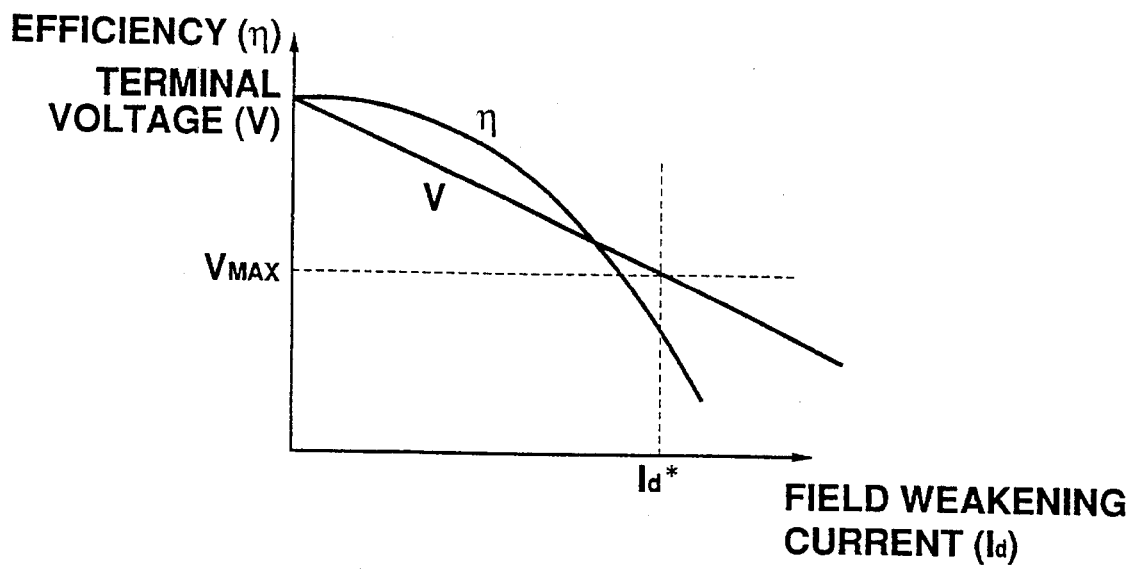
FIG. 3 is an illustration showing the relationship between field weakening current, terminal voltage, and efficiency converted into values per phase.

As shown in FIG. 3, by increasing the absolute value of the field weakening current $I_d$, the terminal voltage V is lowered and also the efficiency η decreases. That is, when the field weakening current $I_d$ increases, the primary current $I=(I_d^{\leftrightarrow 2}+I_q^{\leftrightarrow 2})^{1/2}$ of the PM motor 14 increases, the copper loss increases due to the increase of the current I, and resultingly the efficiency η decreases. Moreover, it is found from FIG. 3 that the efficiency η is maximized at the terminal voltage V equal to or lower than the maximum motor-applied voltage $V_{MAX}$ when the field weakening current $I_d$ at $V=V_{MAX}$ is used as the field weakening reference current $I_d^{\leftrightarrow}$. Therefore, when the maximum motor-applied voltage $V_{MAX}$ is computed in accordance with the battery voltage $V_{dc}$, and the reference field current $I_d^{\leftrightarrow}$ is determined by using the $V_{MAX}$, deterioration of the efficiency η due to excessive flow of the field weakening current $I_d$ or output deficiency due to insufficient field weakening current $I_d$ does not occur.

Figure 3A:
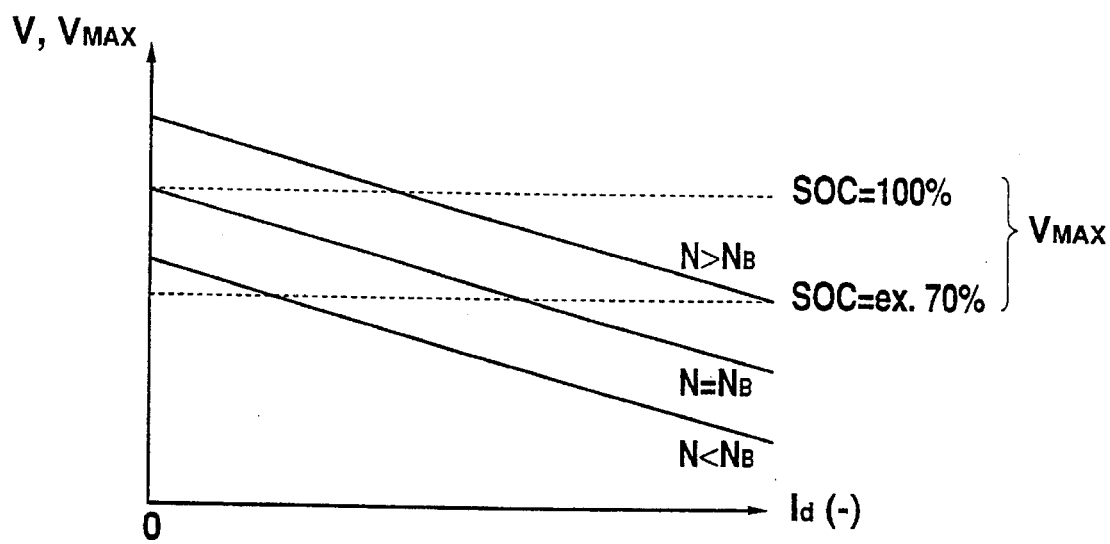
FIG. 3A is an illustration showing the relationship between field weakening current, terminal voltage, maximum motor-applied voltage and motor rotational speed.

In more detail, the reason why the reference field current $I_d^{\leftrightarrow}$ in this embodiment should be set in response to the SOC and therefore to the maximum motor-applied voltage $V_{MAX}$ is presented in the relationship shown in FIG. 3A. As is shown in this figure, the terminal voltage V decreases as the absolute value of the field weakening current $I_d$ increases, and it also decreases as the revolution speed N of the motor 14 decreases. The maximum motor-applied voltage $V_{MAX}$ decreases as the SOC of the battery 10 decreases.

As has been described hereinbefore, since the situation $V>V_{MAX}$ must not occur, the field weakening current $I_d$ must be controlled so that the terminal voltage V is equal to or less than $V_{MAX}$. The field weakening current $I_d$ becomes $I_{dmin}$ when $V=V_{MAX}$. $I_{dmin}$ is determined depending on the revolution speed N and the SOC (or $V_{MAX}$), as shown in FIG. 3A. In this embodiment, the reference field current $_d^{\leftrightarrow}$ is set in response to the maximum motor-applied voltage $V_{MAX}$, on the basis of the above described relationship. In other words, the reference field current $I_d^{\leftrightarrow}$ is controlled so that it is set larger when the SOC or the maximum motor-applied voltage $V_{MAX}$ decreases, because the absolute value of $I_{dmin}$ becomes large. Thus, by using such an $I_d^{\leftrightarrow}$ control adaptive to the SOC, the minimum weakening field current $I_{dmin}$ is obtained, which results in the improved efficiency.

In this embodiment, operations of the current condition computing section 16 are changed in accordance with a mode command. Therefore, driving stressing the output power or driving stressing the efficiency can be carried out, depending on the preference of a vehicle driver.

Figure 4:
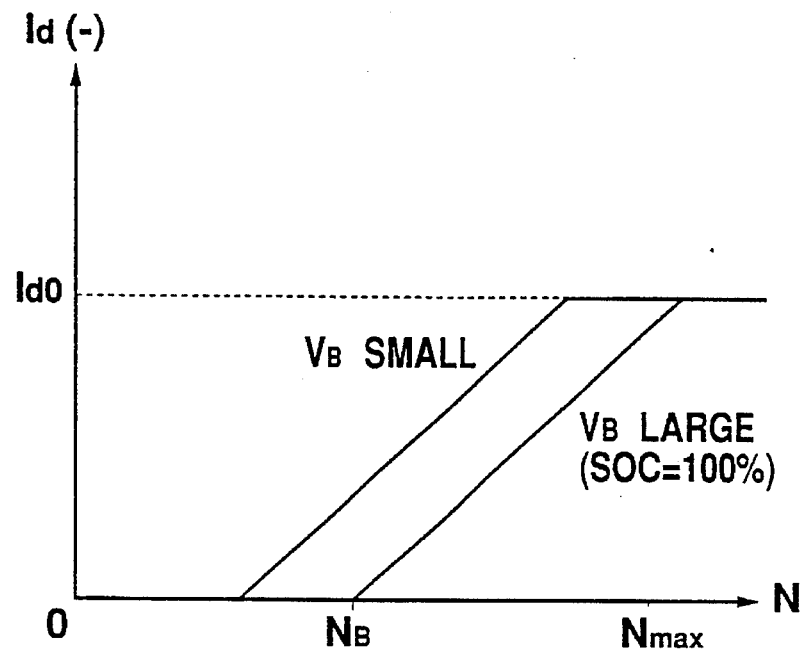
FIG. 4 is an illustration conceptually showing the field current limiting method in the first embodiment, in which symbol $N_{max}$ represents the maximum rotational speed of a PM motor.

A vehicle driver can limit the maximum value of the absolute value of the field weakening reference current $I_d^{\leftrightarrow}$ to $-I_{do}$ by giving, for example, a mode command for selecting the efficiency mode to the current condition computing section 16. That is, when the battery voltage $V_{dc}$ lowers in accordance with the degradation of an SOC, the maximum motor-applied voltage $V_{MAX}$ computed in the step 108 lowers and, as shown in FIG. 4, the absolute value of the field weakening current increases in accordance with the decrease of the voltage If the field weakening current $I_d$ with an increased absolute value is directly outputted as the field weakening reference current $I_d^{\leftrightarrows}$, the efficiency decreases because a current component ($I_d$) that is not contributing to generation of torque, increases. In this embodiment, the value of the field weakening reference current $I_d^{\leftrightarrows}$ is limited to the predetermined value $I_{do}$ in accordance with the degradation of an SOC when the efficiency mode is selected. Therefore, a vehicle driver, particularly a driver stressing the efficiency, can execute driving with the emphasis on efficiency, in accordance with his preference.

A vehicle driver can obtain a PM-motor output not limited by $I_{do}$ in the high rotation region by issuing a mode command for selecting the output mode to the current condition computing section 16 independently of degradation of an SOC. That is, when the above field current limitation is executed, the output range of torque T is narrowed to the low-torque side and as a result output limitation occurs since the motor output is determined by TN. Therefore, this embodiment uses the output mode for omitting the steps 116 and 118 so that the output torque T can be secured.

Figure 5:
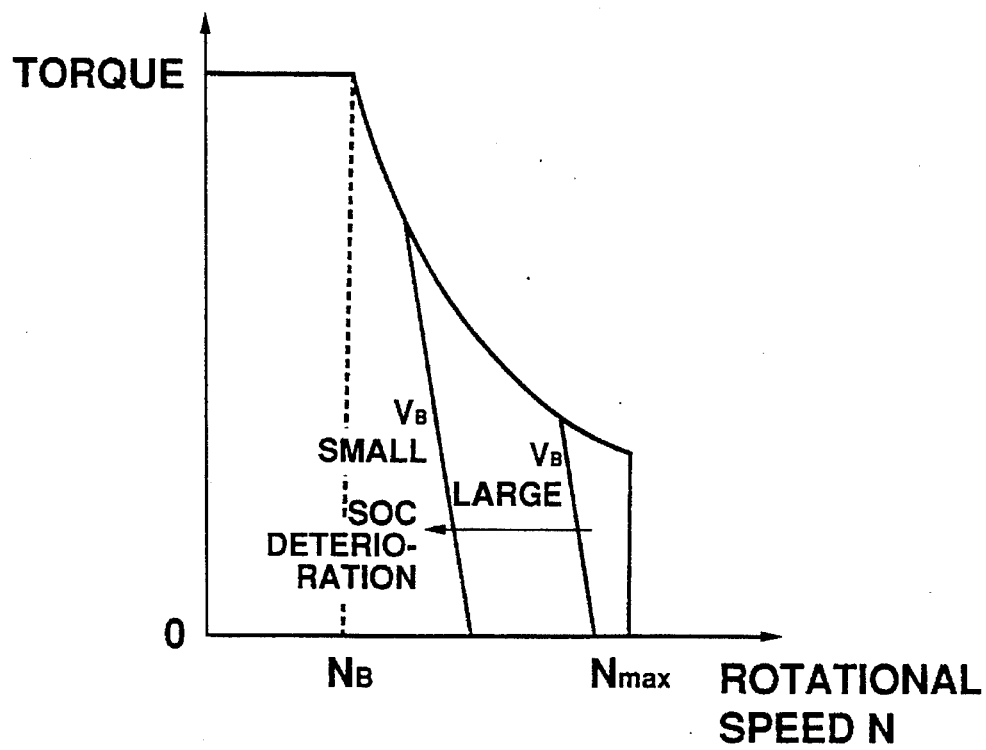
FIG. 5 is an illustration conceptually showing the output limiting method in the first embodiment.
Figure 6:
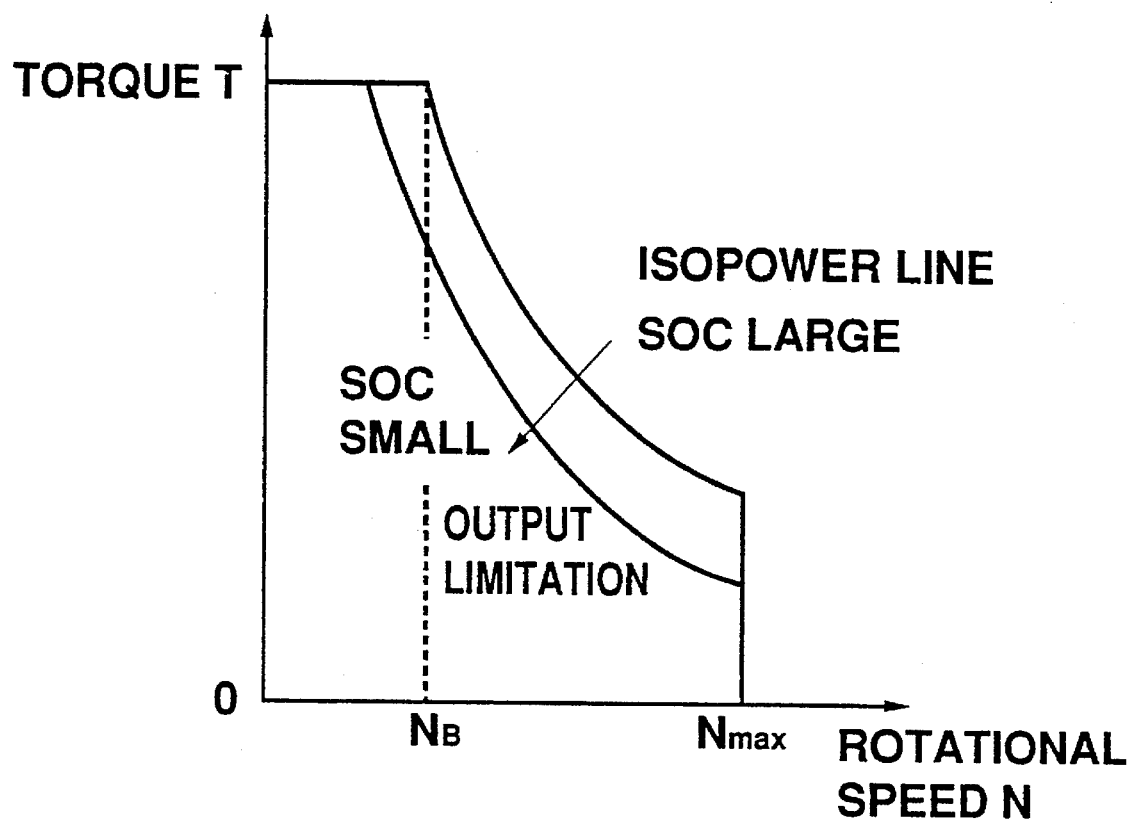
FIG. 6 is an illustration conceptually showing an output limiting method according to the prior art.

Moreover, the output limitation resulting from by the field current limitation does not cause the problem seen in, for example, Japanese Patent Laid-Open No. Hei 5-38003. In this official gazette, the output torque T of a PM motor is limited in accordance with degradation of an SOC as shown in FIG. 6. In FIG. 6, the maximum output torque in the high rotation region is changed from an isopower line with a comparatively high power (line where the PM-motor output power obtained as a product of the output torque T and rotational speed N is constant) to an isopower line with less power in accordance with the degradation of an SOC. In the case of this output limitation, the output torque T is not limited even in the high rotation region as long as the reference torque $T^{\leftrightarrows}$ is low. In this case, however, a loss occurs because field weakening control is performed. Moreover, output is limited even in the medium rotation region in which a high efficiency is to be obtained. In this embodiment, the output limitation due to the field current limitation executed in accordance with degradation of an SOC functions even in the high-rotation low-torque region as shown in FIG. 5. Therefore, the efficiency is prevented from being lowered in spite of the increase of the absolute value of the field current $I_d$ caused by degradation of the SOC, and moreover the accelerating performance from standstill is secured and the drive feeling is favorably secured. Moreover, because the output limitation is not performed in the medium rotation region, a high efficiency is also obtained from this point of view.

In the above description, the only case which is shown is one in which the current vector I of the motor 14 is decomposed into the field current $I_d$ and the torque current $I_q$ to perform vector control. However, it is also possible to perform vector control by decomposing the current I into the absolute value |I| and the phase argI of the motor current This is also applicable to the other embodiments.

(c) Principle of second to fourth embodiments

Figure 7:
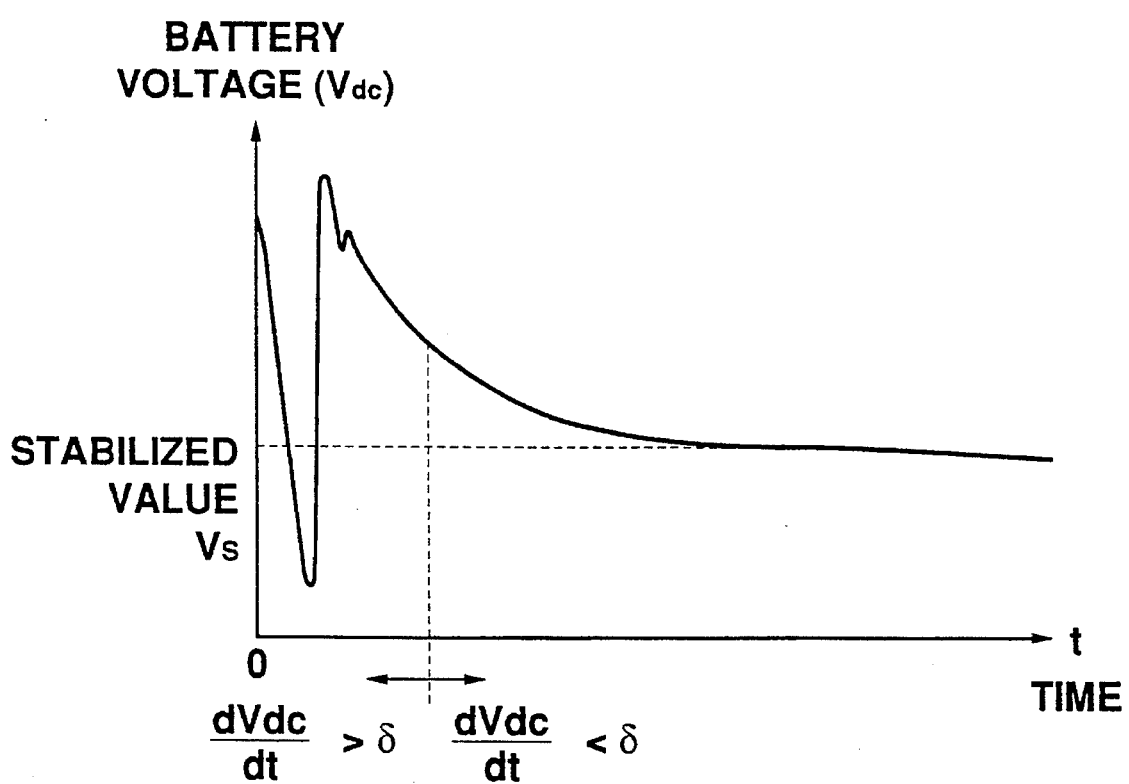
FIG. 7 is a timing chart showing a battery-voltage fluctuation due to loaded operation of a motor.

In the first embodiment, the field weakening reference current $I_d^{\leftrightarrows}$ is determined in accordance with the battery voltage $V_{dc}$. However, the battery voltage $V_{dc}$ is also caused to fluctuate by applying a load to the PM motor 14 which is a driving object. That is, even if the vector of the motor current I is controlled In accordance with the battery voltage $V_{dc}$ detected at the time t=0, the battery voltage $V_{dc}$ is caused to fluctuate due to the load of the PM motor 14 and frequently converges to a value $V_s$ lower than the value at the time t=0 as shown in FIG. 7. Therefore, when control is performed in accordance with the battery voltage $V_{dc}$ at the time t=0 so that the best efficiency is obtained, necessary current may not be obtained from the battery 10 and thereby output may be insufficient for the reference torque $T^{\leftrightarrows}$.

The second to fourth embodiments described below settle the fluctuation of the battery voltage $V_{dc}$ due to the load of the PM motor 14. That is, the embodiments make it possible to operate the PM motor 14 under conditions for maximizing the efficiency by using the approximation set out below as a main principle.

FIGS. 8A–8C and 9A–9C show the field current $I_d$ and torque current $I_q$ for maximizing the efficiency of the PM motor 14, that is, the optimum field current $I_{dp}$ and the optimum torque current $I_{qp}$. Particularly, FIG. 9 shows a case in which a salient-pole motor is used as the PM motor 14. As shown in FIGS. 8 and 9, the optimum field current $I_{dp}$ and the optimum torque current component $I_{qp}$, when using a salient-pole motor as the PM motor 14, depend on the motor rotational speed N, reference torque $T^{\leftrightarrows}$, and battery voltage $V_{dc}$. The field current $I_d$ is negative. Moreover, attention should be paid to the fact that for simplification only, $T^{\leftrightarrows}$ is drawn up to 100% in the case of N=0 and N=$N_1$ (>0) and up to 40% in the case of N=$N_2$ (>$N_1$).

Figures 8A, 8B, 8C:
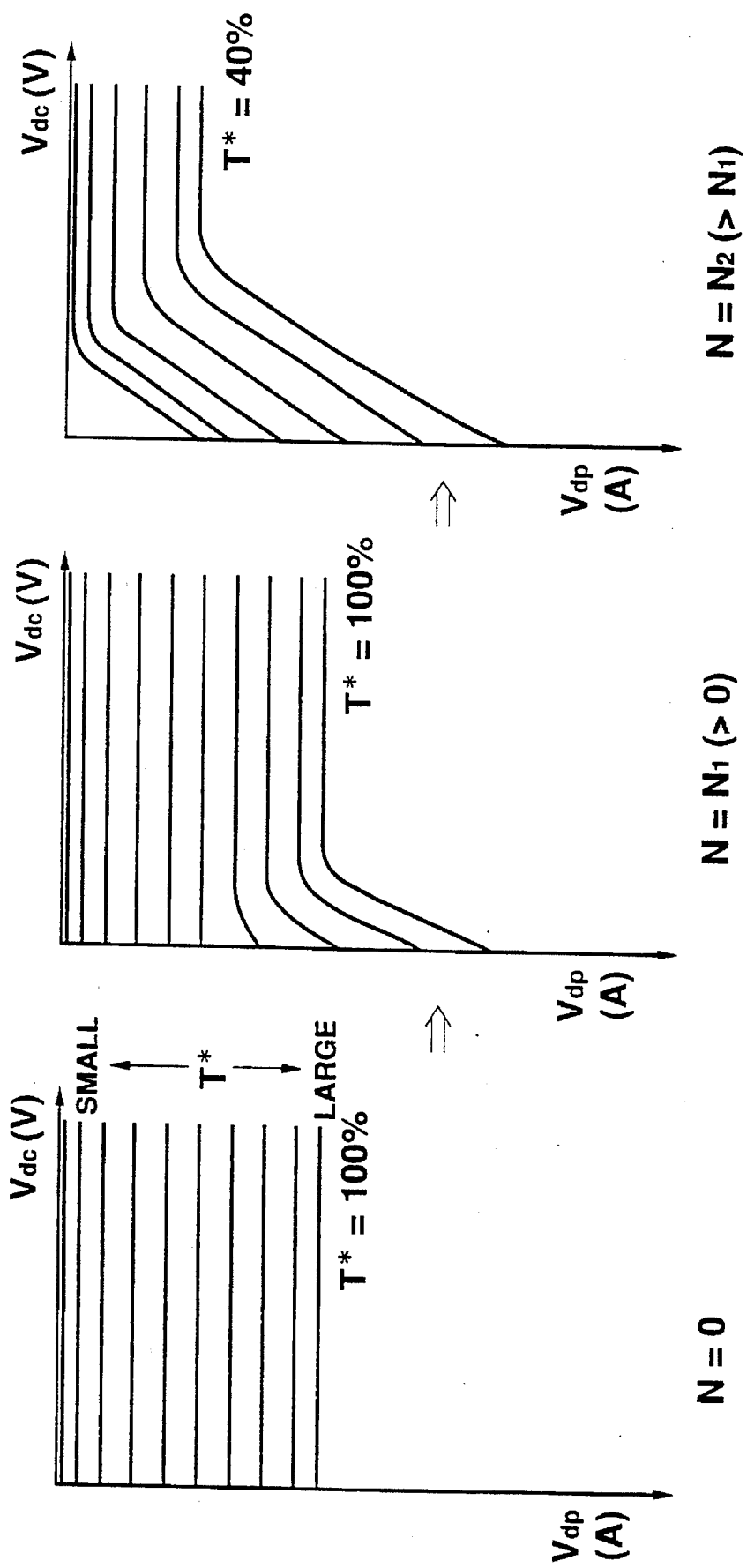
FIGS. 8A–8C are illustrations showing the relation between motor rotational speed, reference torque value and battery voltage, and optimum field current component for maximizing the motor efficiency.

As shown in FIGS. 8A–8C, when the motor rotational speed N equals 0, the value of the optimum field current $I_{dp}$ is constant, independent of the battery voltage $V_{dc}$ but it varies in accordance with the value of the reference torque $T^{\leftrightarrows}$. When the motor rotational speed N increases and reaches $N_1$, and moreover reaches $N_2$, the value of the optimum field current $I_{dp}$ changes In a region where the battery voltage $V_{dc}$ is low. That is, the characteristic of the optimum field current to the battery voltage $V_{dc}$ is inclined. This is because the counter electromotive force of the motor 14 exceeds the battery voltage $V_{dc}$ if the normal field control is performed and therefore the above described field weakening control is executed to prevent the force from exceeding the voltage.

Moreover, as shown in FIGS. 9A–9C, when the motor rotational speed N is 0, the optimum torque current component $I_{qp}$ is constant independently of the battery voltage $V_{dc}$. However, when the motor rotational speed N reaches $N_1$, and moreover reaches $N_2$, the component $I_{qp}$ is inclined in a region where the battery voltage $V_{dc}$ is low. This is because the motor 14 is a salient-pole motor and thereby generates reluctance torque, that is, torque depending on the field current $I_d$ {see the second term of the right side of the equation (1)} and therefore it is necessary to decrease the torque current $I_q$ when increasing the absolute value of the field current $I_d$ in a region where the battery voltage $V_{dc}$ is low in order to maintain an amplitude of the primary current I and to perform field weakening control.

Figure 10:
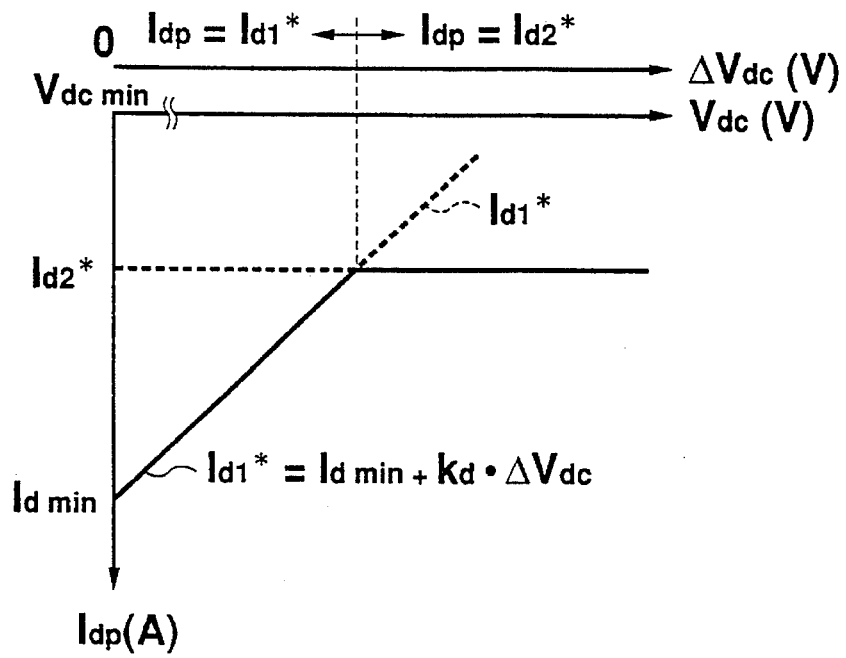
FIG. 10 is an illustration showing the linear equation approximation of the relationship between optimum field current component and battery voltage.
Figure 11:
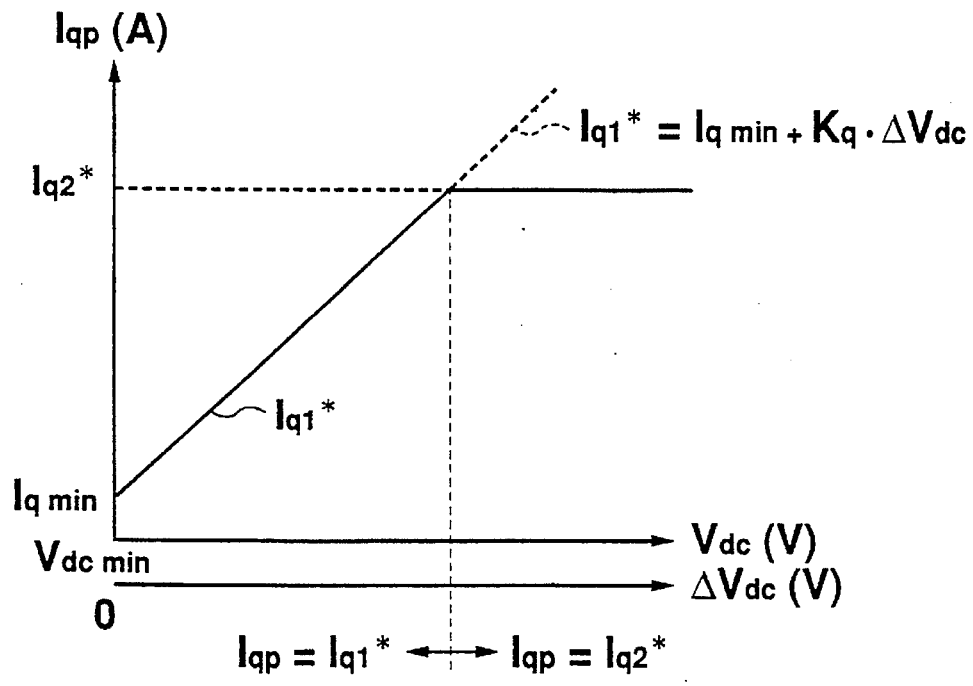
FIG. 11 is an illustration showing the linear equation approximation of the relationship between optimum torque current component and battery voltage.

The relationships shown in FIGS. 8A–8C and 9A–9C, that is, the relationship between the optimum field current $I_{dp}$, optimum torque current $I_{qp}$, and battery voltage $V_{dc}$, can be approximated as shown in FIGS. 10 and 11.

First, the optimum field current $I_{dp}$, as shown in FIG. 10, can be approximated by the straight line of inclination $k_d$ ($I_{d1}^{\leftrightarrows}$ in FIG. 10) in a region where the battery voltage $V_{dc}$ is low and by the value of the optimum field current $I_{dp}$ ($I_{d2}^{\leftrightarrows}$ in FIG. 10) when the motor rotational speed N is 0 in a region where the battery voltage $V_{dc}$ is high. Then, the optimum torque current $I_{qp}$, as shown in FIG. 11, can be approximated by the straight line of inclination kq ($I_{q1}^{\leftrightarrows}$ in FIG. 11) in a region where the battery voltage $V_{dc}$ is low and by the value of the torque current component $I_q$ ($I_{q2}^{\leftrightarrows}$ in FIG. 11) when the motor rotational speed N is 0 in a region where the battery voltage $V_{dc}$ is high. The inclination vector ($k_d$, $k_q$) has a value corresponding to the reference torque $T^{\leftrightarrows}$ and motor rotational speed N. These approximate equations can be expressed as follows:

$I_{dp}=I_{d1}^{\leftrightarrows}$ for $\Delta V_{dc}<0$ $=I_{d2}^{\leftrightarrows}$ for $\Delta V_{dc}\leq 0$ $I_{qp}=I_{q1}^{\leftrightarrows}$ for $\Delta V_{dc}<0$ $=I_{q2}^{\leftrightarrows}$ for $\Delta V_{dc}\leq 0$ $I_{d1}^{\leftrightarrows}=I_{dmin}+k_d*\Delta V_{dc}$ $I_{q1}^{\leftrightarrows}=I_{qmin}+k_d*\Delta V_{dc}$ $\Delta V_{dc}=V_{dc}-V_{dcmin}$ $V_{dcmin}$: A minimum value of $V_{dc}$ which can be outputted from the battery 10 (Reference minimum voltage)

$I_{dmin}$: $I_{dp}$ for $V_{dc}=V_{dcmin}$ $I_{qmin}$: $I_{qp}$ for $V_{dc}=V_{dcmin}$ \hfill (6)

(d) Second embodiment

Figure 12:
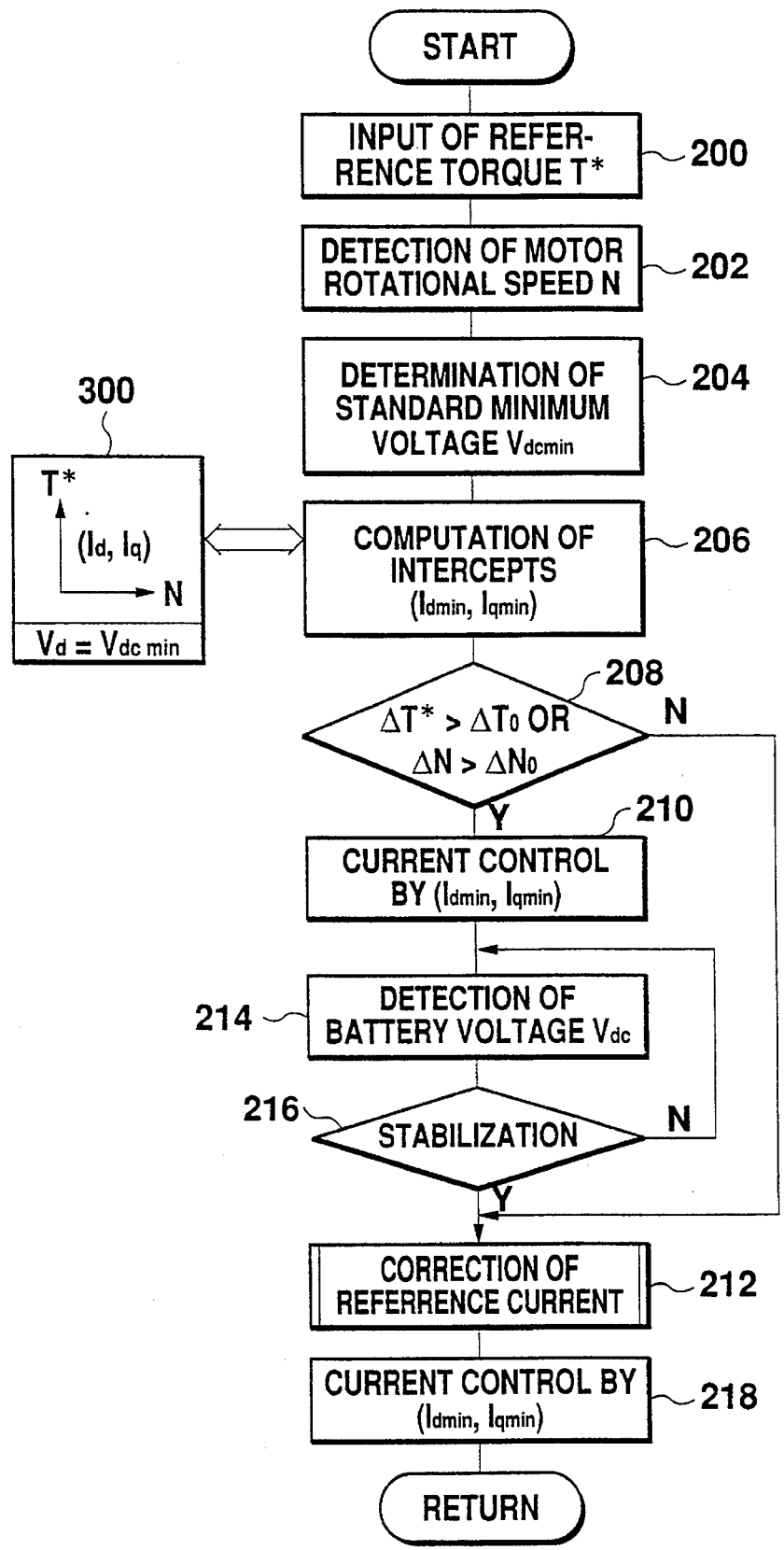
FIG. 12 is a flow chart showing the entire operation of the current condition computing section in the second embodiment of the present invention.

FIG. 12 shows an overall flow of operation of the current condition computing section 16 in the second embodiment of the present invention. This flow is executed at a predetermined frequency.

In this embodiment, the current condition computing section 16 first receives the reference torque $T^{\leftrightarrows}$ from the supervisor controller (200) and detects the motor rotational speed N with the motor rotational-position sensor 20 (202).

Thereafter, the current condition computing section 16 sets the minimum value of the battery voltage $V_{dc}$ which can be outputted from the battery 10 to the reference minimum voltage $V_{dcmin}$ (204). The current condition computing section 16 obtains the values of the optimum field current $I_{dp}$ and the optimum torque current $I_{qp}$ when the battery voltage $V_{dc}$ equals the reference minimum voltage $V_{dcmin}$, that is, the intercept vector ($I_{dmin}$, $I_{qmin}$) of the equation (6) in accordance with the set reference minimum voltage $V_{dcmin}$. In this case, the current condition computing section 16 refers to a previously prepared table 300. This table makes the motor rotational speed N and the reference torque $TI^{\leftrightarrows}$ correspond to the intercept ($I_{dmin}$, $I_{qmin}$). This table can be prepared in accordance with the relationships shown in FIGS. 8 and 9.

Thereafter, the current condition computing section 16 judges whether the reference torque $T^{\leftrightarrows}$ and the motor rotational speed N change by as much as a predetermined value or more (208). That is, the section 16 computes a change $\Delta T^{\leftrightarrows}$ in reference torque $T^{\leftrightarrows}$ and a change $\Delta N$ in motor rotational speed N between the reference torque $T^{\leftrightarrows}$ and the motor rotational speed N respectively, computes this time and the previous time, and judges whether the obtained changes $\Delta T^{\leftrightarrows}$ and $\Delta N$ exceed the predetermined values $\Delta T_o$ and $\Delta N_o$ respectively. As the result of the judgment, when either of the inequalities $\Delta T^{\leftrightarrows}>\Delta T_o$ and $\Delta N>\Delta N_o$ is effected, the current condition computing section 16 commences step 210 by assuming that the load of the motor 14 increases, while it commences the step 212 for cases other than the above.

In the step 210, the current condition computing section 16 outputs the intercept ($I_{dmin}$, $I_{qmin}$) computed in the step 206 to the current control section 18 as the reference current ($I_d^{\leftrightarrows}$, $I_q^{\leftrightarrows}$). Thereby, the vector of the current I of the motor 14 is controlled in accordance with the intercept ($I_{dmin}$, $I_{qmin}$), and in turn, the reference minimum voltage $V_{dcmin}$ of the battery voltage $V_{dc}$. Under the above state, the efficiency of the motor 14 is not maximized. However, the output power of the motor 14 obtained by using the intercept ($I_{dmin}$, $I_{qmin}$) as the reference current ($I_d^{\leftrightarrows}$, $I_q^{\leftrightarrows}$) comes to a value equivalent to the value obtained by multiplying the reference torque $T^{\leftrightarrows}$ by the motor rotational speed N. Therefore, even if the battery voltage $V_{dc}$ fluctuates due to the load of the motor 14 as shown in FIG. 7, at least the requested output power of the motor 14 can be secured.

Thereafter, the current condition computing section 16 waits until the battery voltage $V_{dc}$ is converged (214, 216). Once the battery voltage $V_{dc}$ is sufficiently converged, the current condition computing section 16 corrects the values of the reference current ($I_d^{\leftrightarrows}$, $I_q^{\leftrightarrows}$) in accordance with a converged battery voltage $V_s$ (212) and feeds the corrected reference current ($I_d^{\leftrightarrows}$, $I_q^{\leftrightarrows}$) to the current control section 18 (212). Thereby, the motor 14 is brought into a state in which the maximum efficiency is obtained.

Figure 13:
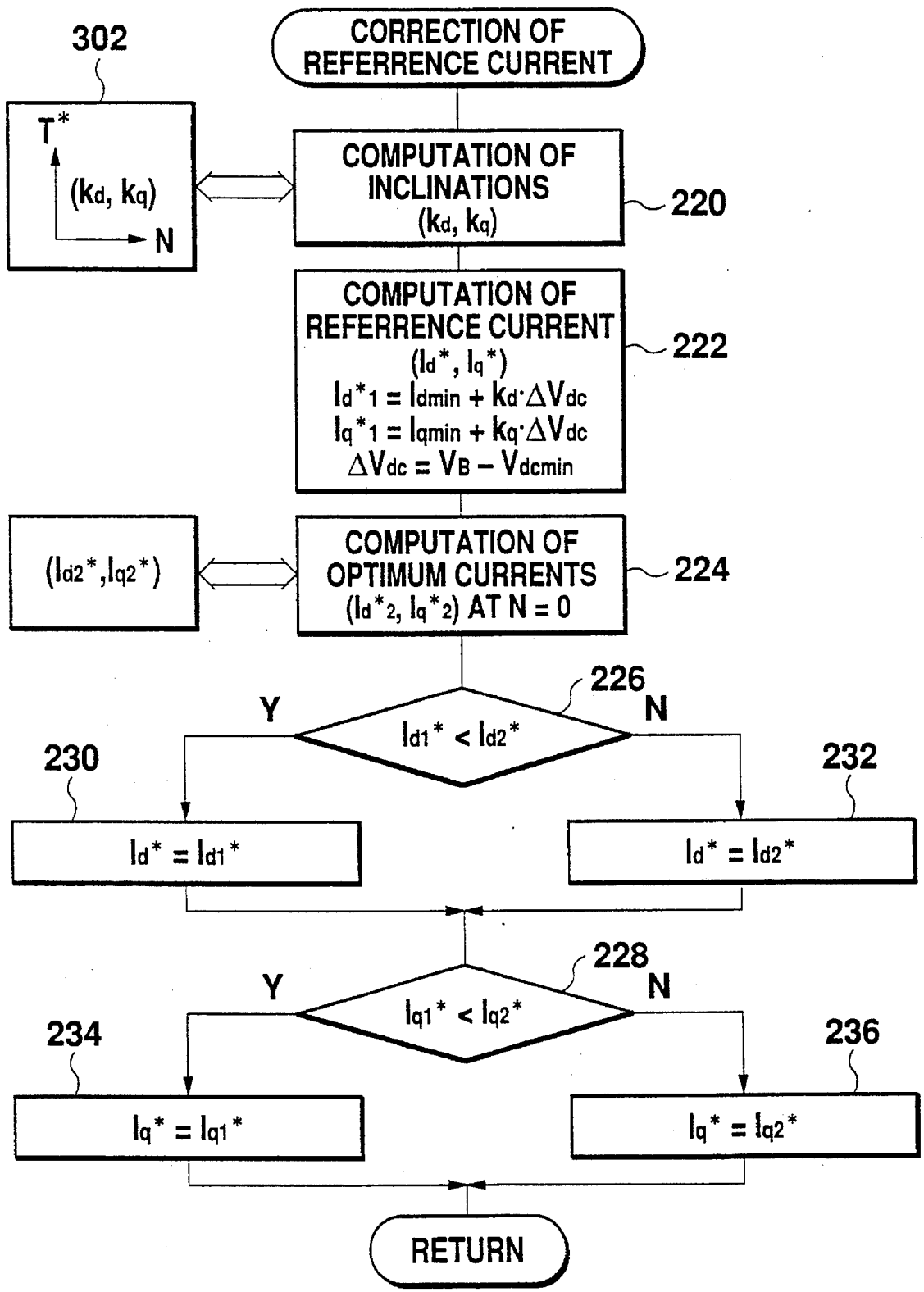
FIG. 13 is a flow chart showing the reference current value correcting operation of the current condition computing section in the second embodiment.

FIG. 13 shows the details of the step 212, that is, the details of correction of the reference current ($I_d^{\leftrightarrows}$, $I_q^{\leftrightarrows}$) in this embodiment.

In this embodiment, the current condition computing section 16 first computes the inclination ($k_d$, $k_q$) to correct the reference current ($I_d^{\leftrightarrows}$, $I_q^{\leftrightarrows}$) (220). In this case, the current condition computing section 16 uses a table 302 for making the reference torque $T^{\leftrightarrows}$ and the motor rotational speed N correspond to the inclination ($k_d$, $k_q$). This table can be prepared in accordance with the relationships shown in FIGS. 8 and 9. The current condition computing section 16 substitutes the obtained inclination ($k_d$, $k_q$) and the intercept ($I_{dmin}$, $I_{qmin}$ for the equation (6) and also substitutes the converged battery voltage $V_s$ for the $V_{dc}$ of the equation (6) to compute an approximate current vector (($I_d^{\leftrightarrows}{}_1$, $I_q^{\leftrightarrows}{}_1$) (222). The approximate current ($I_d^{\leftrightarrows}{}_1$, $I_q^{\leftrightarrows}{}_1$) thus obtained can be used as the reference current ($I_d^{\leftrightarrows}$, $I_q^{\leftrightarrows}$) when the battery voltage $V_{dc}$ is low.

Thereafter, the current condition computing section 16 reads the vector of the motor current I for realizing the maximum efficiency when the motor rotational speed N is 0, that is, the approximate current vector ($I_d^{\leftrightarrows}{}_2$, $I_q^{\leftrightarrows}{}_2$) shown in FIGS. 10 and 11, from a built-in memory (224). The approximate current ($I_d^{\leftrightarrows}{}_2$, $I_q^{\leftrightarrows}{}_2$) read in at step 224 can be used as the reference current ($I_d^{\leftrightarrows}$, $I_q^{\leftrightarrows}$) in a region where the battery voltage $V_{dc}$ is high as shown in FIGS. 10 and 11.

In the steps 226 and 228, the current condition computing section 16 compares the approximate current ($I_d^{\leftrightarrows}{}_1$, $I_q^{\leftrightarrows}{}_1$) obtained in the step 222 with the approximate current ($I_d^{\leftrightarrows}{}_2$, $I_q^{\leftrightarrows}{}_2$) read in the step 224.

In step 226, the judgement relating to the field current is made. In the case of "$I_d^{\leftrightarrows}{}_1<I_d^{\leftrightarrows}{}_2$", it can be considered that the present battery voltage or the converged battery voltage $V_s$ is included in the left region in FIG. 10. That is, it can be considered that the converged battery voltage $V_s$ is in a region where the value of the optimum field current $I_{dp}$ depends on the value of the battery voltage $V_{dc}$. Therefore, the current condition computing section 16 sets the approximate field current $I_d^{\leftrightarrows}{}_1$ obtained in the step 222 to the reference field current $I_d^{\leftrightarrows}$ to be outputted in the step 218 (230).

In the case of "$I_d^{\leftrightarrows}{}_1\leq I_d^{\leftrightarrows}{}_2$", however, it can be considered that the present battery voltage $V_s$ is included in the right region in FIG. 10. That is, it can be considered that the converged battery voltage $V_s$ is in the region where the value of the optimum field current $I_{dp}$ does not depend on the value of the battery voltage $V_{dc}$. Therefore, the current condition computing section 16 sets the approximate field current $I_d^{\leftrightarrow}{}_2$ read in the step 224 to the reference field current $I_d^{\leftrightarrow}$ to be outputted in the step 218 (232).

Moreover, the current condition computing section 16 judges in the step 228 whether $I_q^{\leftrightarrow}{}_1 < I_q^{\leftrightarrow}{}_2$ or not. When the current condition computing section 16 judges that "$I_q^{\leftrightarrow}{}_1 < I_q^{\leftrightarrow}{}_2$", it can be considered that the value of the optimum torque current component $I_{qp}$ is included in the left region (the region where the value of the optimum torque current depends on the value of the battery voltage $V_{dc}$) in FIG. 11. Therefore, the current condition computing section 16 sets the approximate torque current $I_q^{\leftrightarrow}{}_1$ it is obtained in the step 222 to the reference torque current $I_q^{\leftrightarrow}$ to be outputted in the step 218 (234). When the current condition computing section 16 judges that "$I_q^{\leftrightarrow}{}_1 \leq I_q^{\leftrightarrow}{}_2$", however, it can be considered that the battery voltage $V_s$ is included in the right region in FIG. 11, that is, the region where the value of the optimum torque current component I depends on the value of the battery voltage $V_{dc}$. In this case, the current condition computing section 16 sets the approximate torque current $I_q^{\leftrightarrow}{}_2$ read in the step 224 to the reference torque current $I_q^{\leftrightarrow}$ to be outputted in the step 218 (236).

Thus, the reference current $(I_d^{\leftrightarrow}, I_q^{\leftrightarrow})$ in this embodiment is corrected.

Therefore, in this embodiment, because the reference torque $T^{\leftrightarrow}$ and motor rotational speed N are inputted and detected and then the vector of the motor current I is initially controlled in accordance with the reference minimum voltage $V_{dcmin}$, the problem does not occur that necessary output power cannot be obtained from the motor 14 even when the battery voltage $V_{dc}$ fluctuates due to the load of the motor 14.

Moreover, in this embodiment, it is possible to quickly control the efficiency of the motor 14 to the maximum value because the above initial control is performed and the battery voltage $V_{dc}$ is converged and thereafter the vector of the motor current I is controlled in accordance with the converged battery voltage $V_s$.

Furthermore, the maximum efficiency control of the motor 14 is performed by approximating the relation between the optimum current $(I_{dp}, I_{qp})$ for maximizing the efficiency of the motor 14 and the battery voltage $V_{dc}$ with the linear approximation equation in the equation (6) and correcting the initial reference current {=intercept $(I_{dmin}, I_{qmin})$} with the linear approximation equation. Therefore, it is possible to realize the maximum efficiency control of the motor 14 without storing a lot of data showing the relationship between the reference torque value $T^{\leftrightarrow}$, motor rotational speed N, and battery voltage $V_{dc}$. That is, it is only necessary to store the inclination $(k_d, k_q)$ of the linear approximation equation in a region where the battery voltage $V_{dc}$ is low and the values of the approximate current $(I_d^{\leftrightarrow}{}_2, I_q^{\leftrightarrow}{}_2)$ when the motor rotational speed N is 0 in a region where the battery voltage $V_{dc}$ is high. Therefore, it is not necessary to use an expensive CPU having a large memory capacity in order to perform the maximum efficiency control of the motor 14.

Figure 14:
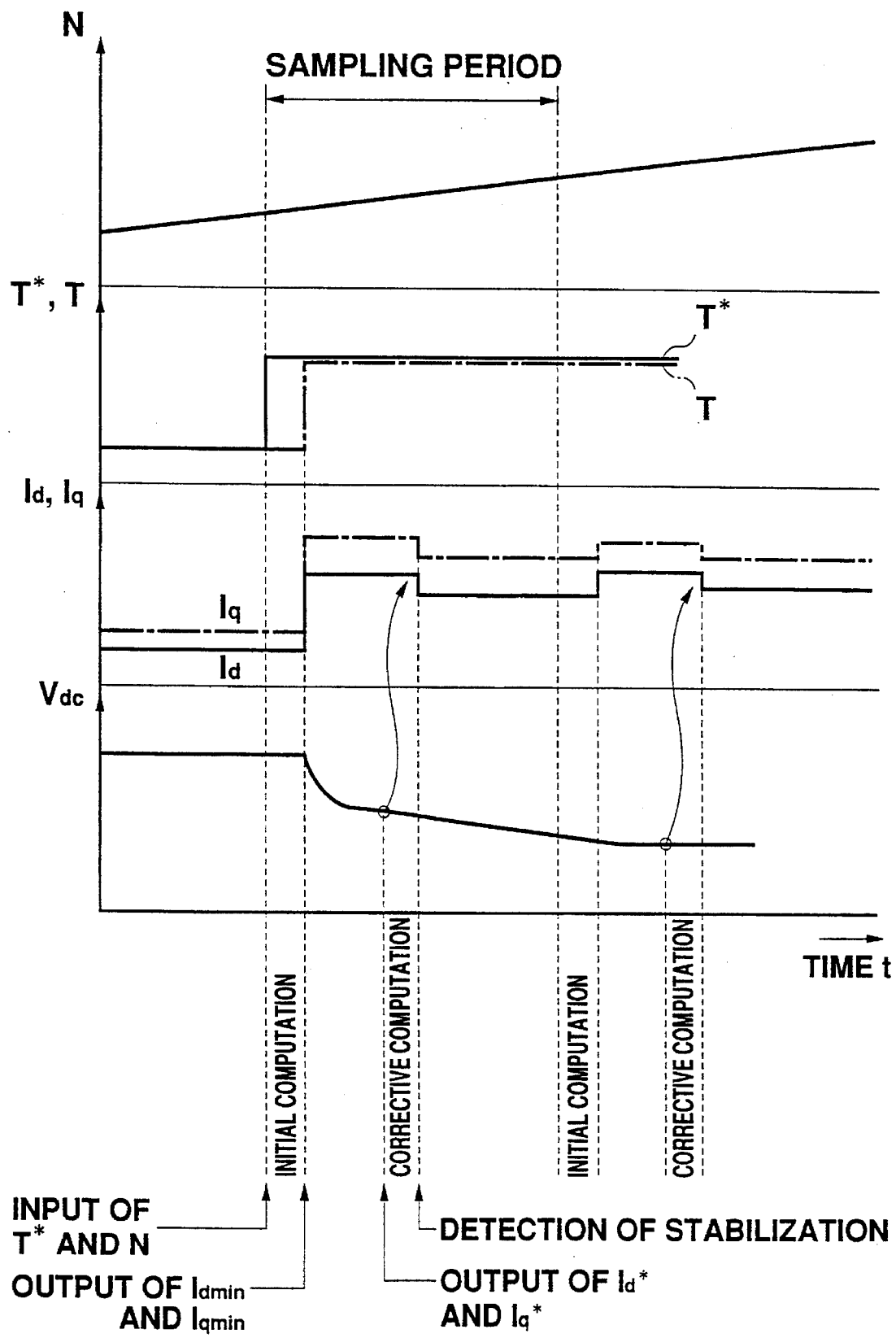
FIG. 14 is a timing chart showing the control timing in the second embodiment.

FIG. 14 shows the control timing in this embodiment.

As shown in FIG. 14, the reference torque $T^{\leftrightarrow}$ and motor rotational speed N are inputted and detected every predetermined sampling period. When the reference torque $T^{\leftrightarrow}$ is inputted and the motor rotational speed N is also inputted, the processing ("initial computation" in FIG. 14) in the step 206 is performed. When the intercept $(I_{dmin}, I_{qmin})$ is obtained, the vector of the motor current I is controlled in accordance with the intercept. After this control is executed, the battery voltage $V_{dc}$ changes due to the load of the motor 14. When the fluctuation of the value of the battery voltage $V_{dc}$ gradually decreases and, for example, $dV_{dc}/dt$ becomes smaller than a predetermined microvalue $\delta$ (see FIG. 7), the current condition computing section 16 judges that the battery voltage $V_{dc}$ has converged to $V_s$ and executes the processing ("corrective computation" in FIG. 14) in the step 212. After the resulting reference current $(I_d^{\leftrightarrow}, I_q^{\leftrightarrow})$ is outputted, the efficiency of the motor 14 is maximized. In this case, symbol T in FIG. 14 represents an actual value of the output torque (actual torque) of the motor 14, which becomes equal to the reference torque value $T^{\leftrightarrow}$ when the initial computation is completed and $(I_{dmin}, I_{qmin})$ is outputted. In FIG. 14, the first-time initial computation is executed due to a change of the reference torque $T^{\leftrightarrow}$ and the second-time initial computation is executed due to a change of the motor rotational speed N.

It is also possible to use a non-salient-pole motor as the motor 14. In this case, the optimum torque current does not decrease in the low rotation region shown in FIG. 9. Moreover, the approximation equation used in the step 212 is not restricted to a linear equation but it is possible to use, for example, a polynomial equation. That is, it is possible to use any equation as an approximation equation in the second embodiment as long as the equation passes through the intercept $(I_{dmin}, I_{qmin})$ and approximates the relationship between the optimum field current $I_{dp}$ and the optimum torque current $I_{qp}$ to the battery voltage $V_{dc}$. These points also apply to the following embodiments.

(e) Third embodiment

Figure 15:
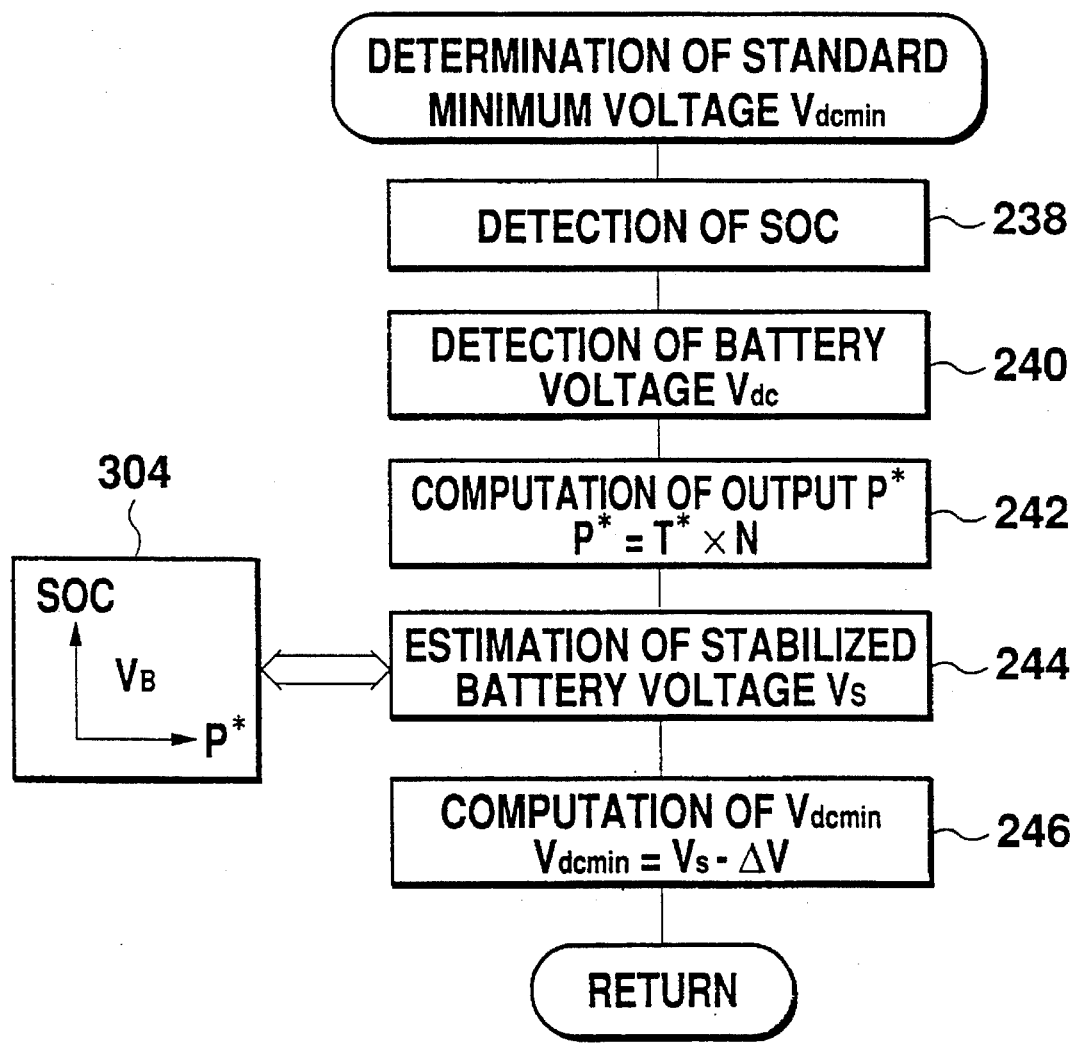
FIG. 15 is a flow chart showing the reference minimum voltage determining operation in the third embodiment of the present invention.

FIG. 15 shows a flow of control of the current condition computing section 16, particularly a flow of the processing in step 204. In this embodiment, the current condition computing section 16 detects an SOC of the battery 10 with the SOC sensor 24 (238) and also detects the battery voltage $V_{dc}$ with the voltage sensor 22 (240). The current condition computing section 16 computes the value of an output reference power $P^{\leftrightarrow}$ to the motor 14 by multiplying together the reference torque $T^{\leftrightarrow}$ and the motor rotational speed N inputted and detected in the steps 200 and 202, respectively (242).

Figure 16A:
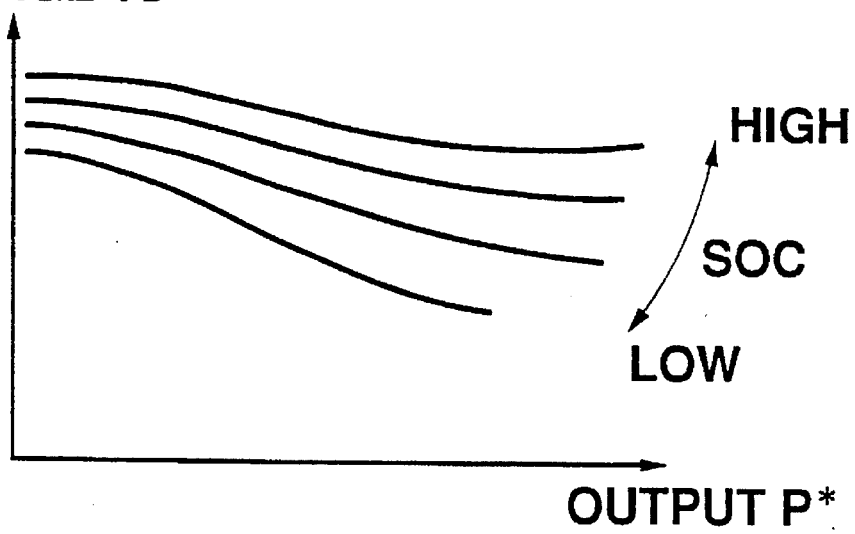
FIGS. 16A and 16B are illustrations showing the method for constructing a reference minimum voltage determining table in the third embodiment of the present invention.
Figure 16B:
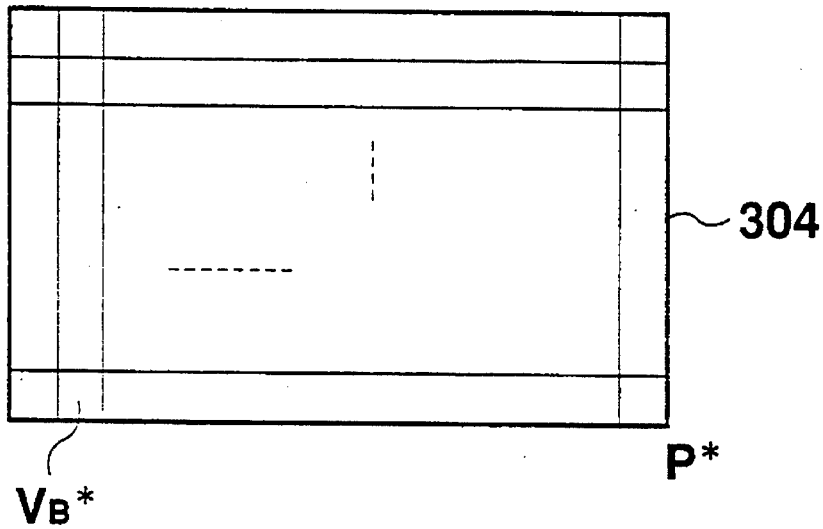
Figure 17:
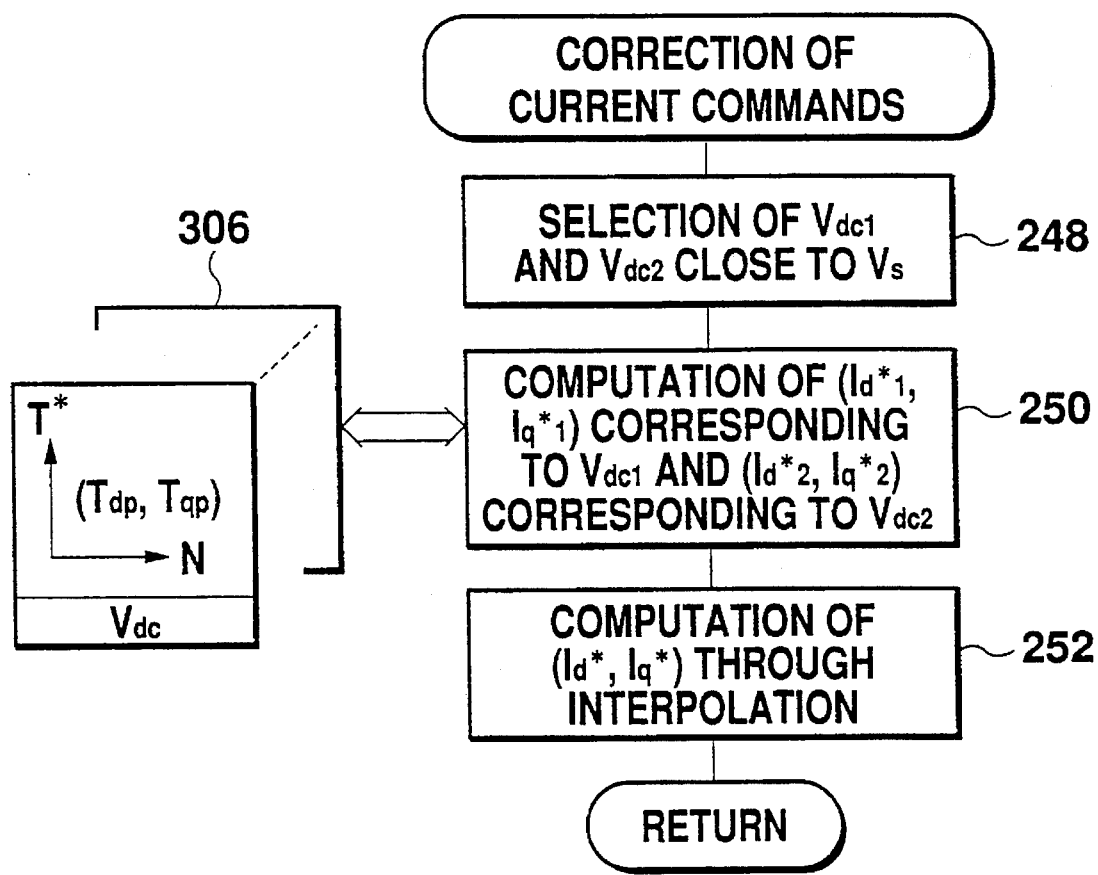
FIG. 17 is a flow chart showing the reference current value correcting operation of the current condition computing section in the fourth embodiment of the present invention.

Then, the current condition computing section 16 estimates the converged battery voltage $V_s$ in accordance with the obtained output reference power $P^{\leftrightarrow}$ and the detected SOC (244). In this case, the current condition computing section 16 refers to a table 204 showing the relationship between the output $P^{\leftrightarrow}$, SOC, and battery voltage $V_s$. That is, the converged battery voltage $V_s$ depends on the output $P^{\leftrightarrow}$ and SOC as shown in FIGS. 16A and 16B and this relationship is stored in the current condition computing section 16 as a table 304.

The current condition computing section 16 sets the reference minimum voltage $V_{dcmin}$ in accordance with the estimated converged battery voltage $V_s$ (246). That is, it sets $V_{dcmin}$ by subtracting a predetermined value $\Delta V$ from $V_s$.

When the motor current $(I_d, I_q)$ is controlled in accordance with the reference minimum voltage $V_{dcmin}$ thus set (210), it is possible to secure the output of the motor 14 even though the battery voltage $V_{dc}$ fluctuates due to a load as described above. Moreover, when the reference minimum voltage $V_{dcmin}$ is set by considering an SOC of the battery 10 as is done in this embodiment, it is not necessary to excessively decrease the reference minimum voltage $V_{dcmin}$ and it is possible to control the efficiency of the motor 14, before convergence of the battery voltage after execution of the step 110, to a reasonably high value, although the value is not maximum.

(f) Fourth embodiment

FIG. 10 shows a flow of the operation of the current condition computing section 16 in the fourth embodiment of the present invention, particularly a flow of the reference current correcting operation in step 212.

In this embodiment, the current condition computing section 16 computes the reference current ($I_d^{\leftrightarrow}$, $I_q^{\leftrightarrow}$) by using a table 306. The table 306 includes a plurality of unit tables for making the optimum current ($I_{dp}$, $I_{qp}$) correspond to the reference torque $T^{\leftrightarrow}$ and motor rotational speed N. Each of these unit tables is made to correspond to each digitized value of the battery voltage $V_{dc}$. To compute the reference current ($I_d^{\leftrightarrow}$, $I_q^{\leftrightarrow}$) by using the table 306, the current condition computing section 16 first selects $V_{dc1}$ and $V_{dc2}$ which are the closest to the converged battery voltage $V_s$ out of the battery voltages $V_{dc}$ included in the table 306 (248). The current condition computing section 16 computes the reference currents ($I_d^{\leftrightarrow}{}_1$, $I_q^{\leftrightarrow}{}_1$) and ($I_d^{\leftrightarrow}{}_2$ and $I_q^{\leftrightarrow}{}_2$) corresponding to the values $V_{dc1}$ and $V_{dc2}$ respectively by using not only the reference torque $T^{\leftrightarrow}$ and the motor rotational speed N but also $V_{dc1}$ and $V_{dc2}$ as keys, and referring to the table 306 (250). The current condition computing section 16 computes the reference current ($I_d^{\leftrightarrow}$, $I_q^{\leftrightarrow}$) to be outputted in the step 218 through the interpolation of the obtained reference currents ($I_d^{\leftrightarrow}{}_1$, $I_q^{\leftrightarrow}{}_1$) and ($I_d^{\leftrightarrow}{}_2$ and $I_q^{\leftrightarrow}{}_2$) (252).

Figure 18:
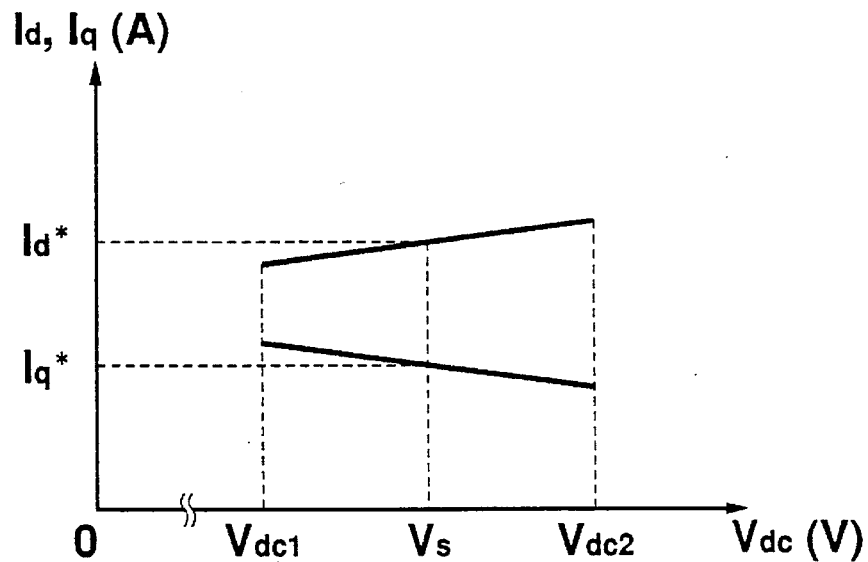
FIG. 18 is an illustration showing the interpolating operation executed in the fourth embodiment.
Figure 19:
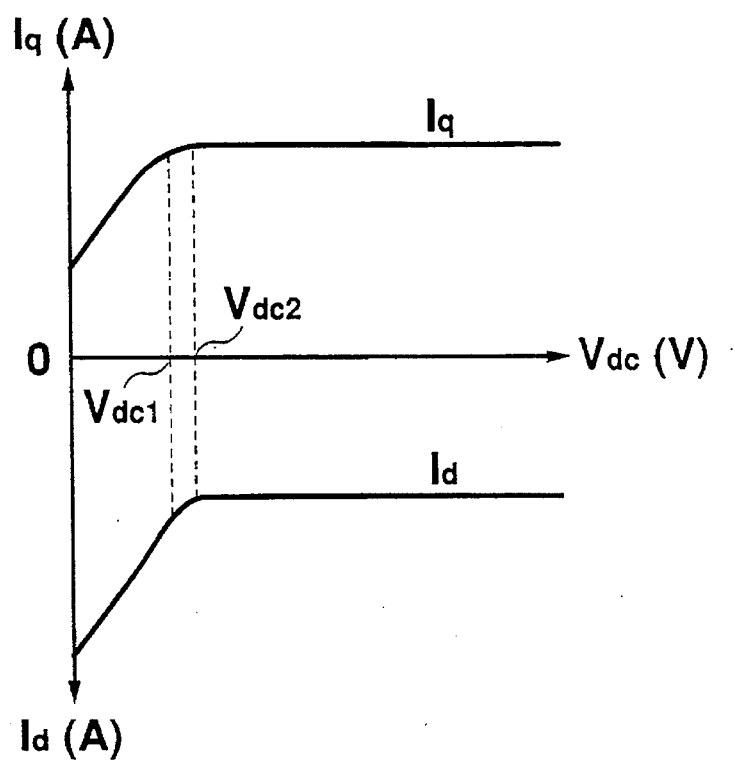
FIG. 19 is an illustration showing the relationship between $V_{dc1}$ and $V_{dc2}$ in FIG. 18.
Figure 20:
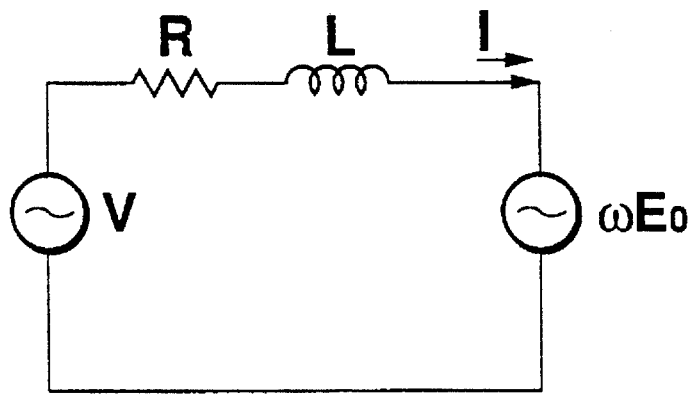
FIG. 20 is a circuit diagram showing an equivalent circuit per phase of a PM motor.
Figure 21:
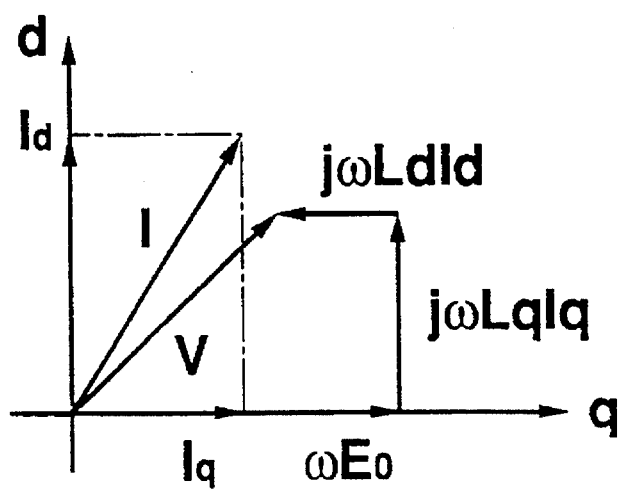
FIG. 21 is a vector diagram of a PM motor.
Figure 22:
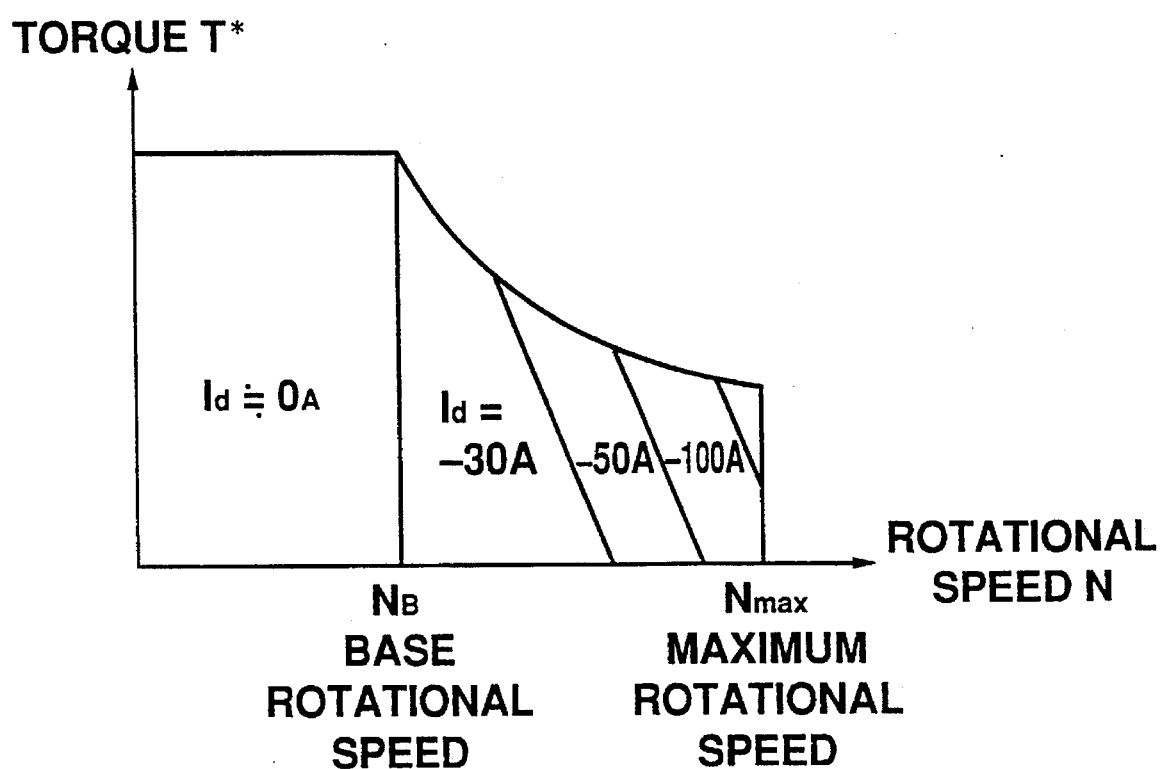
FIG. 22 is an illustration showing the relationship between motor rotational speed and torque when field weakening control is performed.

Therefore, in this embodiment, the reference current ($I_d^{\leftrightarrow}$, $I_q^{\leftrightarrow}$) with the value shown in FIG. 18 is outputted. However, the inclination of ($I_d$, $I_q$) is that in the voltage region shown in FIG. 19.

(g) Supplement

As described above, the present invention makes it possible to obtain the optimum field weakening current $I_d$ independently of the fluctuation of the SOC of a battery or that of the load of a PM motor because the field weakening current $I_d$ is controlled in accordance with a change of the battery voltage $V_{dc}$. Therefore, it is possible to maintain the predetermined efficiency η without causing excessive field weakening current to flow when the battery voltage $V_{dc}$ is comparatively high and to obtain the current I required to obtain the necessary torque T when the battery voltage $V_{dc}$ is comparatively low.

Moreover, when the allowable power-source voltage $V_B$ is computed in accordance with the battery voltage $V_{dc}$ and the PWM modulation rate of an inverter, the above advantage can preferably be obtained in controlling the terminal voltage V of a PM motor through the PWM control.

Furthermore, by limiting the field weakening current $I_d$ in accordance with the SOC of a battery when the field weakening current $I_d$ is computed in accordance with the battery voltage $V_{dc}$, the efficiency η can be prevented from being lowered because a decrease of the battery voltage $V_{dc}$ due to degradation of the SOC does not cause the field weakening current $I_d$ to increase. Also in this case, an accelerating performance from standstill is secured because the torque T is secured in a low-rotation high-torque region. Therefore, by using the PM motor as the driving mechanism of an electric vehicle, it is possible to secure a preferable drive feeling.

Furthermore, when limitation of the field weakening current $I_d$ is executed or stopped in accordance with, for example, a command from a user, the user can select drive in consideration of efficiency or drive in consideration of output. Thus, it is possible to flexibly satisfy the user's preference.

Furthermore, in the case where the vector of the motor current I is initially controlled on the assumption that the battery voltage $V_{dc}$ is the reference minimum voltage $V_{dcmin}$ and at the time of the convergence of the battery voltage $V_{dc}$ after this vector control, the vector of the motor current I is controlled in accordance with the converged battery voltage $V_s$, the motor output power can be prevented from decreasing even if the battery voltage fluctuates due to load after vector control. Furthermore, because the motor efficiency η can be controlled to the maximum value after the battery voltage $V_{dc}$ is converged, it is possible to obtain a driving and controlling apparatus having a high energy efficiency and suitable for mounting on an electric vehicle or the like.

Furthermore, when the reference minimum voltage $V_{dcmin}$ is set in accordance with the SOC of a battery and the voltage $V_{dc}$, the reference minimum voltage $V_{dcmin}$ can be prevented from being excessively lowered, and a comparatively high motor efficiency η can be realized, even before the battery voltage $V_{dc}$ is converged.

Furthermore, when the relationship between the battery voltage $V_{dc}$ and the optimum current ($I_{dp}$, $I_{qp}$) is approximated by a mathematical equation in a region where the optimum current for maximizing the motor efficiency η depends on the battery voltage $V_{dc}$ to store the coefficient such as the inclination ($k_d$, $k_q$) of the approximation equation or the optimum current ($I_d^{\leftrightarrow}{}_1$, $I_q^{\leftrightarrow}{}_1$) are stored in a region where the optimum current ($I_{dp}$, $I_{qp}$) does not depend on the battery voltage $V_{dc}$, it is possible to execute vector control after the battery voltage $V_{dc}$ is converged by using these stored pieces of information. Therefore, it is not necessary to store a complicated relationship between the reference torque value $T^{\leftrightarrow}$, motor rotational speed N, and battery voltage $V_{dc}$ and an apparatus which can be realized at a low cost is obtained.

Furthermore, when the above approximation equation is used as a linear equation and the inclination ($k_d$, $k_q$) or intercept of the linear equation are stored as the coefficient, it is possible to make the advantage of decreasing the stored information content more remarkable. An intercept can use the initial reference current ($I_{dmin}$, $I_{qmin}$).

What is claimed is:

1. A driving and controlling apparatus for use in a drive unit having a synchronous motor using permanent magnets as its field system which can be excited by a field flux generated by the permanent magnets and a field flux generated by a field current component of a primary current; a battery as a source of power; and power conversion means for converting a discharged power of the battery into alternating current, and then feeding the alternating current as the primary current to the synchronous motor; said apparatus comprising:

current control means for controlling the primary current of the synchronous motor in accordance with a reference current; and current condition determination means for determining the reference current in accordance with a voltage of the battery so that the reference current is minimized under predetermined conditions and at least partially cancelling the field flux generated by the permanent magnets with the field flux generated by the field current component so that a counter electromotive force of the synchronous motor does not exceed the voltage of the battery and so that the field flux generated by the field current component has an magnitude corresponding to the voltage of the battery.

2. The driving and controlling apparatus according to claim 1 wherein the current condition determination means has:

counter electromotive force judgment means for judging whether or not the counter electromotive force of the synchronous motor exceeds the voltage of the battery in accordance with an output state of the synchronous motor;

means for determining the reference current so that the field flux generated by the field current component is fixed to a certain value, when it has been judged that the counter electromotive force does not exceed the voltage of the battery; and means for determining the reference current so that the counter electromotive force of the synchronous motor does not exceed the voltage of the battery and so that the field flux generated by the field current component has the magnitude corresponding to the voltage of the battery, when it has been judged that the counter electromotive force exceeds the voltage of the battery.

3. The driving and controlling apparatus according to claim 2 wherein the output state of the synchronous motor used to judge whether or not the counter electromotive force of the synchronous motor exceeds the voltage of the battery is a rotational speed of the synchronous motor; and the current condition determination means judges that the counter electromotive force of the synchronous motor exceeds the voltage of the battery, when the rotational speed of the synchronous motor is higher than a predetermined value, and judges that the counter electromotive force does not exceed the voltage of the battery, when the rotational speed is not higher than the predetermined value.

4. The driving and controlling apparatus according to claim 1 wherein the reference current includes the reference field current representative of a control target of the field current component of the primary current and the reference torque current representative of a control target of the torque current component of the primary current; and the current condition determination means has:

reference field current determination means for determining the reference field current in accordance with at least the voltage of the battery so that the counter electromotive force of the synchronous motor does not exceed the voltage of the battery and so that the field flux generated by the field current component has the magnitude corresponding to the voltage of the battery; and reference torque current determination means for determining the reference torque current in accordance with at least a reference torque so that torque corresponding to the reference torque is outputted from the synchronous motor.

5. The driving and controlling apparatus according to claim 4 wherein the reference field current determination means further refers to the reference torque in order to determine the reference field current, and the reference torque current determination means further refers to the voltage of the battery in order to determine the reference torque current.

6. The driving and controlling apparatus according to claim 5 wherein the current condition determination means has conversion means for converting the voltage of the battery into a value comparable with a terminal voltage of the synchronous motor; and the reference field current determination means and the reference torque current determination means, by using the converted voltage of the battery as the terminal voltage and the reference torque as torque, derive information regarding the field current component and torque current component from a map showing a relationship among the terminal voltage, field current component, torque current component and the torque of the synchronous motor, thereby determining the reference field current and the reference torque current, respectively.

7. The driving and controlling apparatus according to claim 5 wherein the current condition determination means has conversion means for converting the voltage of the battery into a value comparable with a terminal voltage of the synchronous motor; and the reference field current determination means and the reference torque current determination means, by using the converted voltage of the battery as the terminal voltage and the reference torque as torque, derive information regarding the field current component and torque current component from an equation showing a relationship among the terminal voltage, field current component, torque current component and the torque of the synchronous motor, thereby determining the reference field current and the reference torque current, respectively.

8. The driving and controlling apparatus according to claim 7 wherein the conversion means converts the voltage of the battery into the value comparable with the terminal voltage based on a maximum power conversion rate of the power conversion means.

9. The driving and controlling apparatus according to claim 7 wherein the current condition determination means has means for limiting the value of the field current component, when the remaining capacity of the battery is not more than a predetermined value, thereby decreasing said at least partially cancelled part of the field flux generated by the permanent magnets which is cancelled with the field flux generated by the field current component.

10. The driving and controlling apparatus according to claim 9 wherein the current condition determination means has means for prohibiting the limitation of the field current component in response to a mode command representing the efficiency mode.

11. The driving and controlling apparatus according to claim 1 wherein the current condition determination means has:

means for determining an initial reference current in accordance with a reference torque, an output state, and a reference minimum voltage on the assumption that the voltage of the battery is the reference minimum voltage, when either of the reference torque or the output state of the synchronous motor change by as much as a predetermined value or more, and supplying the determined initial reference current to the current control means as the reference current; and means for determining the reference current in accordance with the constant value voltage of the battery, after the primary current of the synchronous motor has been controlled in accordance with the initial reference current.

12. The driving and controlling apparatus according to claim 11 wherein the current condition determination means has means for determining the reference minimum voltage in accordance with the remaining capacity and voltage of the battery.

13. The driving and controlling apparatus according to claim 11 wherein an optimum value of the primary current is dependent on the voltage of the battery when the output state of the synchronous motor is in a predetermined region and is independent of the voltage of the battery when the output state of the synchronous motor is not in the predetermined region, the optimum current being representative of the reference current where the reference torque is realized as the torque of the synchronous motor and the efficiency of the synchronous motor substantially becomes a maximum efficiency;

the current condition determination means includes:

means for computing a first optimum reference current by referring to a relationship among the voltage of the battery, the optimum primary current and the output state of the synchronous motor, using the constant value voltage of the battery and the output state of the synchronous motor in a region where the value of the optimum primary current is dependent on the voltage of the battery;

means for determining a second optimum reference current in accordance with the optimum primary current in a region where the optimum primary current is independent of the voltage of the battery;

means for selecting either of the first optimum reference current or the second optimum reference current on the basis of a relationship between the magnitude of the first optimum reference current and that of the second optimum reference current; and means for determining selected optimum reference current as the reference current.

14. The driving controlling apparatus according to claim 13 wherein the current condition determination means includes:

first storage means for storing a coefficient of a mathematical equation in the output state of the synchronous motor associated therewith, the mathematical equation representing a relationship between the voltage of the battery and the optimum current in the region where the value of the optimum current depends on the voltage of the battery, second storage means for storing the optimum primary current in the region where the optimum primary current does not depend on the voltage of the battery;

means for reading the coefficient of the mathematical equation in accordance with the output state of the synchronous motor, and computing the first optimum reference current by the use of the coefficient, the constant value voltage of the battery and the mathematical equation; and means for determining the second optimum reference current by reading the optimum primary current from the region where the optimum primary current does not depend on the voltage of the battery.

15. The driving and controlling apparatus according to claim 14 wherein the mathematical equation is a predetermined linear equation, and the first storage means stores at least one of an intercept or an inclination of the linear equation as a coefficient associated with the motor output state.

16. The driving and controlling apparatus according to claim 15 wherein the intercept of the linear equation is used as the initial reference current.

17. The driving and controlling apparatus according to claim 1 wherein the current condition determination means has:

counter electromotive force judgment means for judging whether or not the counter electromotive force of the synchronous motor exceeds the voltage of the battery in accordance with an output state of the synchronous motor;

means for determining the reference current so that the field flux generated by the field current component is fixed to 0, when it has been judged that the counter electromotive force does not exceed the voltage of the battery; and means for determining the reference current so that the counter electromotive force of the synchronous motor does not exceed the voltage of the battery and so that the field flux generated by the field current component has the intensity corresponding to the voltage of the battery, when it has been judged that the counter electromotive force exceeds the voltage of the battery.

18. A method for controlling a drive unit having a synchronous motor using permanent magnets as its field system which can be excited by a field flux generated by the permanent magnet and a field flux generated by a field current component in a primary current; a battery as a source of power; and power conversion means for converting a discharged power of the battery into alternating current, and then feeding the alternating current as the primary current to the synchronous motor; said method comprising the steps of:

judging whether or not the counter electromotive force of the synchronous motor exceeds the voltage of the battery in accordance with the output state of the synchronous motor;

determining a reference current so that the field flux generated by the field current component may be fixed to a specific value, when it has been judged that the counter electromotive force does not exceed the voltage of the battery;

minimizing the reference current in accordance with the voltage of the battery so that the counter electromotive force of the synchronous motor does not exceed the voltage of the battery and so that the field flux generated by the field current component has a magnitude corresponding to the voltage of the battery, when it has been judged that the counter electromotive force exceeds the voltage of the battery; and controlling the primary current of the synchronous motor in accordance with the reference current to at least partially cancel the field flux generated by permanent magnets with the field flux generated by the field current component.

19. A method for controlling a drive unit having a synchronous motor using permanent magnets as its field system which can be excited by a field flux generated by the permanent magnets and a field flux generated by a field current component in a primary current; a battery as a source of power; and power conversion means for converting a discharged power of the battery into alternating current, and then feeding the alternating current as the primary current to the synchronous motor; said method comprising:

a first step of judging whether or not either of a reference torque or an output state of the synchronous motor change by as much as a predetermined value or more;

a second step of determining an initial reference current in accordance with the reference torque, the output state and a reference minimum voltage based on the voltage of the battery being the reference minimum voltage, when either of the reference torque or the output state of the synchronous motor change by as much as a predetermined value or more;

a third step of controlling the primary current of the synchronous motor in accordance with the initial reference current;

a fourth step of determining the reference current in accordance with the constant value voltage of the battery so that the counter electromotive force of the synchronous motor does not exceed the voltage of the battery and so that the field flux generated by the field current component has a magnitude corresponding to the voltage of the battery, when the voltage of the battery reaches a constant value after the primary current of the synchronous motor has been controlled in accordance with the initial reference current; and a fifth step of controlling the primary current of the synchronous motor in accordance with the reference current to at least partially cancel the field flux generated by permanent magnets with the field flux generated by the field current component.

20. The method according to claim 19 wherein, an optimum primary current is dependent on the voltage of the battery when the output state of the synchronous motor is in a predetermined region and is independent of the voltage of the battery when the output state of the synchronous motor is not in the predetermined region, the optimum primary current representative of the reference current where the reference torque is realized as the torque of the synchronous motor and the efficiency of the synchronous motor substantially becomes a maximum efficiency;

said fourth step includes:

a sixth step of computing a first optimum reference current by referring to a relationship among the voltage of the battery, the optimum current and the output state of the synchronous motor, using the constant value voltage of the battery and the output state of the synchronous motor in a region where the value of the optimum primary current depends on the voltage of the battery;

a seventh step of determining a second optimum reference current in accordance with the optimum primary current in a region where the optimum primary current does not depend on the voltage of the battery;

an eighth step of selecting either of the first optimum reference current or the second optimum reference current on the basis of a relationship between the magnitude of the first optimum reference current and that of the second optimum reference current; and a ninth step of determining selected optimum reference current as the reference current.

21. The method according to claim 20 which further comprises the steps of:

storing a coefficient of a mathematical equation in the output state of the synchronous motor associated therewith, the mathematical equation approximately representing a relationship between the voltage of the battery and the optimum current in a region where the value of the optimum current depends on the voltage of the battery; and storing the optimum primary current in a region where the optimum primary current does not depend on the voltage of the battery; and wherein said sixth step further includes a step of reading the coefficient of the equation in accordance with the output state of the synchronous motor, and computing the first optimum reference current by the use of the read coefficient, a constant value voltage of the battery and the mathematical equation; and said seventh step further includes a step of determining the second optimum reference current by reading the optimum primary current in the region where the optimum primary current does not depend on the voltage of the battery.

22. The method according to claim 21 wherein the mathematical equation is a predetermined linear equation, and the coefficient to be stored is at least one of an intercept or an inclination of the linear equation.

* * * * *